(12) United States Patent
Shabtay et al.

(10) Patent No.: US 12,332,412 B2
(45) Date of Patent: Jun. 17, 2025

(54) COMPACT FOLDED TELE CAMERAS

(71) Applicant: Corephotonics Ltd., Tel Aviv (IL)

(72) Inventors: Gal Shabtay, Tel Aviv (IL); Nadav Goulinski, Tel Aviv (IL); Ephraim Goldenberg, Tel Aviv (IL); Michael Scherer, Tel Aviv (IL); Ziv Shemesh, Tel Aviv (IL)

(73) Assignee: Corephotonics Ltd., Tel Aviv (IL)

( * ) Notice: Subject to any disclaimer, the term of this patent is extended or adjusted under 35 U.S.C. 154(b) by 0 days.

(21) Appl. No.: 19/013,270

(22) Filed: Jan. 8, 2025

(65) Prior Publication Data

US 2025/0155687 A1 May 15, 2025

Related U.S. Application Data

(63) Continuation of application No. 18/571,742, filed as application No. PCT/IB2022/055745 on Jun. 21, 2022, now Pat. No. 12,228,709.
(Continued)

(51) Int. Cl.
*G02B 13/00* (2006.01)
*G02B 9/34* (2006.01)

(52) U.S. Cl.
CPC .......... *G02B 13/0065* (2013.01); *G02B 9/34* (2013.01); *G02B 13/004* (2013.01)

(58) Field of Classification Search
CPC ..... G02B 13/0065; G02B 9/34; G02B 13/004
See application file for complete search history.

(56) References Cited

U.S. PATENT DOCUMENTS

| 2,106,752 A | 2/1938 | Land |
| 2,354,503 A | 7/1944 | Arthur |

(Continued)

FOREIGN PATENT DOCUMENTS

| CN | 101025470 A | 8/2007 |
| CN | 101634738 A | 1/2010 |

(Continued)

OTHER PUBLICATIONS

A compact and cost effective design for cell phone zoom lens, Chang et al., Sep. 2007, 8 pages.
(Continued)

*Primary Examiner* — Collin X Beatty
(74) *Attorney, Agent, or Firm* — Nathan & Associates; Menachem Nathan

(57) ABSTRACT

Folded digital cameras, comprising a lens with $N \geq 3$ lens elements $L_i$ and having an EFL, an aperture diameter DA, a f-number f/#, a TTL, and a BFL, wherein each lens element has a respective focal length $f_i$ and wherein a first lens element $L_1$ faces an object side and a last lens element $L_N$ faces an image side; an image sensor having a sensor diagonal (SD); and an optical path folding element (OPFE) for providing a folded optical path between an object and the image sensor, wherein the lens is located at an object side of the OPFE, wherein the EFL is in the range of 8 mm<EFL<50 mm, and wherein a ratio between the BFL and the TTL fulfills BFL/TTL>0.75.

20 Claims, 19 Drawing Sheets

Related U.S. Application Data

(60) Provisional application No. 63/291,628, filed on Dec. 20, 2021, provisional application No. 63/288,047, filed on Dec. 10, 2021, provisional application No. 63/245,892, filed on Sep. 19, 2021, provisional application No. 63/213,899, filed on Jun. 23, 2021.

(56) References Cited

U.S. PATENT DOCUMENTS

| | | |
|---|---|---|
| 2,378,170 A | 6/1945 | Aklin |
| 2,441,093 A | 5/1948 | Aklin |
| 3,388,956 A | 6/1968 | Eggert et al. |
| 3,524,700 A | 8/1970 | Eggert et al. |
| 3,558,218 A | 1/1971 | Grey |
| 3,864,027 A | 2/1975 | Harada |
| 3,942,876 A | 3/1976 | Betensky |
| 4,134,645 A | 1/1979 | Sugiyama et al. |
| 4,338,001 A | 7/1982 | Matsui |
| 4,465,345 A | 8/1984 | Yazawa |
| 4,792,822 A | 12/1988 | Akiyama et al. |
| 5,000,551 A | 3/1991 | Shibayama |
| 5,327,291 A | 7/1994 | Baker et al. |
| 5,331,465 A | 7/1994 | Miyano |
| 5,600,488 A | 2/1997 | Minefuji et al. |
| 5,969,869 A | 10/1999 | Hirai et al. |
| 6,014,266 A | 1/2000 | Obama et al. |
| 6,035,136 A | 3/2000 | Hayashi et al. |
| 6,147,702 A | 11/2000 | Smith |
| 6,169,636 B1 | 1/2001 | Kreitzer |
| 6,654,180 B2 | 11/2003 | Ori |
| 7,187,504 B2 | 3/2007 | Horiuchi |
| 7,206,136 B2 | 4/2007 | Labaziewicz et al. |
| 7,274,516 B2 | 9/2007 | Kushida et al. |
| 7,515,351 B2 | 4/2009 | Chen et al. |
| 7,564,635 B1 | 7/2009 | Tang |
| 7,643,225 B1 | 1/2010 | Tsai |
| 7,660,049 B2 | 2/2010 | Tang |
| 7,684,128 B2 | 3/2010 | Tang |
| 7,688,523 B2 | 3/2010 | Sano |
| 7,692,877 B2 | 4/2010 | Tang et al. |
| 7,697,220 B2 | 4/2010 | Lyama |
| 7,738,186 B2 | 6/2010 | Chen et al. |
| 7,777,972 B1 | 8/2010 | Chen et al. |
| 7,813,057 B2 | 10/2010 | Lin |
| 7,821,724 B2 | 10/2010 | Tang et al. |
| 7,826,149 B2 | 11/2010 | Tang et al. |
| 7,826,151 B2 | 11/2010 | Tsai |
| 7,869,142 B2 | 1/2011 | Chen et al. |
| 7,898,747 B2 | 3/2011 | Tang |
| 7,916,401 B2 | 3/2011 | Chen et al. |
| 7,918,398 B2 | 4/2011 | Li et al. |
| 7,957,075 B2 | 6/2011 | Tang |
| 7,957,076 B2 | 6/2011 | Tang |
| 7,957,079 B2 | 6/2011 | Tang |
| 7,961,406 B2 | 6/2011 | Tang et al. |
| 8,000,031 B1 | 8/2011 | Tsai |
| 8,004,777 B2 | 8/2011 | Sano et al. |
| 8,077,400 B2 | 12/2011 | Tang |
| 8,149,523 B2 | 4/2012 | Ozaki |
| 8,218,253 B2 | 7/2012 | Tang |
| 8,228,622 B2 | 7/2012 | Tang |
| 8,233,224 B2 | 7/2012 | Chen |
| 8,253,843 B2 | 8/2012 | Lin |
| 8,279,537 B2 | 10/2012 | Sato |
| 8,363,337 B2 | 1/2013 | Tang et al. |
| 8,395,851 B2 | 3/2013 | Tang et al. |
| 8,400,717 B2 | 3/2013 | Chen et al. |
| 8,451,549 B2 | 5/2013 | Yamanaka et al. |
| 8,503,107 B2 | 8/2013 | Chen et al. |
| 8,514,502 B2 | 8/2013 | Chen |
| 8,570,668 B2 | 10/2013 | Takakubo et al. |
| 8,718,458 B2 | 5/2014 | Okuda |
| 8,780,465 B2 | 7/2014 | Chae |
| 8,810,923 B2 | 8/2014 | Shinohara |
| 8,854,745 B1 | 10/2014 | Chen |
| 8,958,164 B2 | 2/2015 | Kwon et al. |
| 9,185,291 B1 | 11/2015 | Shabtay |
| 9,201,223 B2 | 12/2015 | Ohashi |
| 9,229,194 B2 | 1/2016 | Yoneyama et al. |
| 9,235,036 B2 | 1/2016 | Kato et al. |
| 9,279,957 B2 | 3/2016 | Kanda et al. |
| 9,438,792 B2 | 9/2016 | Nakada et al. |
| 9,488,802 B2 | 11/2016 | Chen et al. |
| 9,568,712 B2 | 2/2017 | Dror et al. |
| 9,678,310 B2 | 6/2017 | Iwasaki et al. |
| 9,817,213 B2 | 11/2017 | Mercado |
| 9,835,834 B2 | 12/2017 | Li et al. |
| 9,869,846 B1 | 1/2018 | Bone et al. |
| 10,330,892 B2 | 6/2019 | Hashimoto |
| 10,948,696 B2 | 3/2021 | Shabtay et al. |
| 11,340,425 B2 | 5/2022 | Yamazaki |
| 11,347,016 B2 | 5/2022 | Shabtay et al. |
| 12,069,371 B2 | 8/2024 | Shabtay et al. |
| 2002/0118471 A1 | 8/2002 | Imoto |
| 2003/0048542 A1 | 3/2003 | Enomoto |
| 2004/0095503 A1 | 5/2004 | Iwasawa et al. |
| 2005/0041300 A1 | 2/2005 | Oshima et al. |
| 2005/0062346 A1 | 3/2005 | Sasaki |
| 2005/0128604 A1 | 6/2005 | Kuba |
| 2005/0141103 A1 | 6/2005 | Nishina |
| 2005/0168840 A1 | 8/2005 | Kobayashi et al. |
| 2005/0270667 A1 | 12/2005 | Gurevich et al. |
| 2006/0092524 A1 | 5/2006 | Konno |
| 2006/0238902 A1 | 10/2006 | Nakashima et al. |
| 2006/0262420 A1 | 11/2006 | Matsumoto et al. |
| 2006/0275025 A1 | 12/2006 | Labaziewicz et al. |
| 2007/0114990 A1 | 5/2007 | Godkin |
| 2007/0183058 A1 | 8/2007 | Bito et al. |
| 2007/0188884 A1 | 8/2007 | Yoshitsugu et al. |
| 2007/0229983 A1 | 10/2007 | Saori |
| 2007/0247726 A1 | 10/2007 | Sudoh |
| 2007/0253689 A1 | 11/2007 | Nagai et al. |
| 2008/0056698 A1 | 3/2008 | Lee et al. |
| 2008/0094730 A1 | 4/2008 | Toma et al. |
| 2008/0094738 A1 | 4/2008 | Lee |
| 2008/0117527 A1 | 5/2008 | Nuno et al. |
| 2008/0273250 A1 | 11/2008 | Nishio |
| 2008/0291531 A1 | 11/2008 | Heimer |
| 2008/0304161 A1 | 12/2008 | Souma |
| 2009/0002839 A1 | 1/2009 | Sato |
| 2009/0067063 A1 | 3/2009 | Asami et al. |
| 2009/0122423 A1 | 5/2009 | Park et al. |
| 2009/0135245 A1 | 5/2009 | Luo et al. |
| 2009/0141365 A1 | 6/2009 | Jannard et al. |
| 2009/0147368 A1 | 6/2009 | Oh et al. |
| 2009/0161228 A1 | 6/2009 | Lee |
| 2009/0225438 A1 | 9/2009 | Kubota |
| 2009/0279191 A1 | 11/2009 | Yu |
| 2009/0303620 A1 | 12/2009 | Abe et al. |
| 2010/0007967 A1 | 1/2010 | Ohashi |
| 2010/0026878 A1 | 2/2010 | Seo |
| 2010/0033844 A1 | 2/2010 | Katano |
| 2010/0060995 A1 | 3/2010 | Yumiki et al. |
| 2010/0165476 A1 | 7/2010 | Eguchi |
| 2010/0214664 A1 | 8/2010 | Chia |
| 2010/0277813 A1 | 11/2010 | Ito |
| 2011/0001838 A1 | 1/2011 | Lee |
| 2011/0032409 A1 | 2/2011 | Rossi et al. |
| 2011/0080655 A1 | 4/2011 | Mori |
| 2011/0102667 A1 | 5/2011 | Chua et al. |
| 2011/0102911 A1 | 5/2011 | Iwasaki |
| 2011/0115965 A1 | 5/2011 | Engelhardt et al. |
| 2011/0149119 A1 | 6/2011 | Matsui |
| 2011/0157430 A1 | 6/2011 | Hosoya et al. |
| 2011/0188121 A1 | 8/2011 | Goring et al. |
| 2011/0249347 A1 | 10/2011 | Kubota |
| 2012/0062783 A1 | 3/2012 | Tang et al. |
| 2012/0069455 A1 | 3/2012 | Lin et al. |
| 2012/0092777 A1 | 4/2012 | Tochigi et al. |
| 2012/0105708 A1 | 5/2012 | Hagiwara |
| 2012/0147489 A1 | 6/2012 | Matsuoka |
| 2012/0154929 A1 | 6/2012 | Tsai et al. |
| 2012/0194923 A1 | 8/2012 | Um |
| 2012/0229920 A1 | 9/2012 | Otsu et al. |

(56) References Cited

U.S. PATENT DOCUMENTS

| | | |
|---|---|---|
| 2012/0262806 A1 | 10/2012 | Lin et al. |
| 2012/0314299 A1 | 12/2012 | Tashiro et al. |
| 2013/0002933 A1 | 1/2013 | Topliss et al. |
| 2013/0057971 A1 | 3/2013 | Zhao et al. |
| 2013/0088788 A1 | 4/2013 | You |
| 2013/0176479 A1 | 7/2013 | Wada |
| 2013/0208178 A1 | 8/2013 | Park |
| 2013/0271852 A1 | 10/2013 | Schuster |
| 2013/0279032 A1 | 10/2013 | Suigetsu et al. |
| 2013/0286488 A1 | 10/2013 | Chae |
| 2014/0022436 A1 | 1/2014 | Kim et al. |
| 2014/0036112 A1 | 2/2014 | Scarff |
| 2014/0063616 A1 | 3/2014 | Okano et al. |
| 2014/0092487 A1 | 4/2014 | Chen et al. |
| 2014/0139719 A1 | 5/2014 | Fukaya et al. |
| 2014/0146216 A1 | 5/2014 | Okumura |
| 2014/0160581 A1 | 6/2014 | Cho et al. |
| 2014/0204480 A1 | 7/2014 | Jo et al. |
| 2014/0240853 A1 | 8/2014 | Kubota et al. |
| 2014/0285907 A1 | 9/2014 | Tang et al. |
| 2014/0293453 A1 | 10/2014 | Ogino et al. |
| 2014/0362274 A1 | 12/2014 | Christie et al. |
| 2015/0022896 A1 | 1/2015 | Cho et al. |
| 2015/0029601 A1 | 1/2015 | Dror et al. |
| 2015/0116569 A1 | 4/2015 | Mercado |
| 2015/0138431 A1 | 5/2015 | Shin et al. |
| 2015/0153548 A1 | 6/2015 | Kim et al. |
| 2015/0160438 A1 | 6/2015 | Okuda |
| 2015/0168667 A1 | 6/2015 | Kudoh |
| 2015/0177496 A1 | 6/2015 | Marks et al. |
| 2015/0205068 A1 | 7/2015 | Sasaki |
| 2015/0244942 A1 | 8/2015 | Shabtay et al. |
| 2015/0253532 A1 | 9/2015 | Lin |
| 2015/0253543 A1 | 9/2015 | Mercado |
| 2015/0253647 A1 | 9/2015 | Mercado |
| 2015/0323757 A1 | 11/2015 | Bone |
| 2015/0373252 A1 | 12/2015 | Georgiev |
| 2015/0373263 A1 | 12/2015 | Georgiev et al. |
| 2016/0007008 A1 | 1/2016 | Molgaard et al. |
| 2016/0033742 A1 | 2/2016 | Huang |
| 2016/0044250 A1 | 2/2016 | Shabtay et al. |
| 2016/0062084 A1 | 3/2016 | Chen et al. |
| 2016/0062136 A1 | 3/2016 | Nomura et al. |
| 2016/0070088 A1 | 3/2016 | Koguchi |
| 2016/0085089 A1 | 3/2016 | Mercado |
| 2016/0105616 A1 | 4/2016 | Shabtay et al. |
| 2016/0187631 A1 | 6/2016 | Choi et al. |
| 2016/0195691 A1 | 7/2016 | Bito et al. |
| 2016/0202455 A1 | 7/2016 | Aschwanden et al. |
| 2016/0212333 A1 | 7/2016 | Liege et al. |
| 2016/0241756 A1 | 8/2016 | Chen |
| 2016/0291295 A1 | 10/2016 | Shabtay |
| 2016/0306161 A1 | 10/2016 | Harada et al. |
| 2016/0313537 A1 | 10/2016 | Mercado |
| 2016/0341931 A1 | 11/2016 | Liu et al. |
| 2016/0349504 A1 | 12/2016 | Kim et al. |
| 2016/0353008 A1 | 12/2016 | Osborne |
| 2017/0023778 A1 | 1/2017 | Inoue |
| 2017/0052350 A1 | 2/2017 | Chen |
| 2017/0094187 A1 | 3/2017 | Sharma et al. |
| 2017/0102522 A1 | 4/2017 | Jo |
| 2017/0115471 A1 | 4/2017 | Shinohara |
| 2017/0153422 A1 | 6/2017 | Tang et al. |
| 2017/0160511 A1 | 6/2017 | Kim et al. |
| 2017/0199360 A1 | 7/2017 | Chang |
| 2017/0276911 A1 | 9/2017 | Huang |
| 2017/0276914 A1 | 9/2017 | Yao et al. |
| 2017/0310952 A1 | 10/2017 | Adomat et al. |
| 2017/0329108 A1 | 11/2017 | Hashimoto et al. |
| 2017/0337703 A1 | 11/2017 | Wu et al. |
| 2018/0024319 A1 | 1/2018 | Lai et al. |
| 2018/0048825 A1 | 2/2018 | Wang |
| 2018/0059365 A1 | 3/2018 | Bone et al. |
| 2018/0059376 A1 | 3/2018 | Lin et al. |
| 2018/0081149 A1 | 3/2018 | Bae et al. |
| 2018/0120674 A1 | 5/2018 | Avivi et al. |
| 2018/0149835 A1 | 5/2018 | Park |
| 2018/0196236 A1 | 7/2018 | Ohashi et al. |
| 2018/0196238 A1 | 7/2018 | Goldenberg et al. |
| 2018/0217475 A1 | 8/2018 | Goldenberg et al. |
| 2018/0218224 A1 | 8/2018 | Olmstead et al. |
| 2018/0224630 A1 | 8/2018 | Lee et al. |
| 2018/0253877 A1 | 9/2018 | Kozub et al. |
| 2018/0268226 A1 | 9/2018 | Shashua et al. |
| 2019/0025549 A1 | 1/2019 | Hsueh et al. |
| 2019/0025554 A1 | 1/2019 | Son |
| 2019/0049687 A1 | 2/2019 | Bachar et al. |
| 2019/0075284 A1 | 3/2019 | Ono |
| 2019/0086638 A1 | 3/2019 | Lee |
| 2019/0094500 A1 | 3/2019 | Tseng et al. |
| 2019/0107651 A1 | 4/2019 | Sade |
| 2019/0121216 A1 | 4/2019 | Shabtay et al. |
| 2019/0155002 A1 | 5/2019 | Shabtay et al. |
| 2019/0170965 A1 | 6/2019 | Shabtay |
| 2019/0187443 A1 | 6/2019 | Jia et al. |
| 2019/0187486 A1 | 6/2019 | Goldenberg et al. |
| 2019/0196148 A1 | 6/2019 | Yao et al. |
| 2019/0215440 A1 | 7/2019 | Rivard et al. |
| 2019/0222758 A1 | 7/2019 | Goldenberg et al. |
| 2019/0235202 A1 | 8/2019 | Smyth et al. |
| 2019/0353874 A1 | 11/2019 | Yeh et al. |
| 2020/0064597 A1 | 2/2020 | Shabtay et al. |
| 2020/0084358 A1 | 3/2020 | Nadamoto |
| 2020/0192069 A1 | 6/2020 | Makeev et al. |
| 2020/0221026 A1 | 7/2020 | Fridman et al. |
| 2020/0241233 A1 | 7/2020 | Shabtay et al. |
| 2020/0333691 A1 | 10/2020 | Shabtay et al. |
| 2020/0400926 A1 | 12/2020 | Bachar |
| 2021/0026117 A1 | 1/2021 | Yao |
| 2021/0048628 A1 | 2/2021 | Shabtay et al. |
| 2021/0048649 A1 | 2/2021 | Goldenberg et al. |
| 2021/0096338 A1* | 4/2021 | Saiga ............... G02B 17/0832 |
| 2021/0165192 A1 | 6/2021 | Goldenberg et al. |
| 2021/0263276 A1 | 8/2021 | Huang et al. |
| 2021/0364746 A1 | 11/2021 | Chen |
| 2021/0396974 A1 | 12/2021 | Kuo |
| 2022/0004085 A1 | 1/2022 | Shabtay et al. |
| 2022/0046151 A1 | 2/2022 | Shabtay et al. |
| 2022/0066168 A1 | 3/2022 | Shi |
| 2022/0113511 A1 | 4/2022 | Chen |
| 2022/0206264 A1 | 6/2022 | Rudnick et al. |
| 2022/0232167 A1 | 7/2022 | Shabtay et al. |
| 2023/0080199 A1 | 3/2023 | Eromaki et al. |

FOREIGN PATENT DOCUMENTS

| | | |
|---|---|---|
| CN | 102147519 A | 8/2011 |
| CN | 102193162 A | 9/2011 |
| CN | 102466865 A | 5/2012 |
| CN | 102466867 A | 5/2012 |
| CN | 102147519 B | 1/2013 |
| CN | 103576290 A | 2/2014 |
| CN | 103698876 A | 4/2014 |
| CN | 104297906 A | 1/2015 |
| CN | 104407432 A | 3/2015 |
| CN | 105467563 A | 4/2016 |
| CN | 105657290 A | 6/2016 |
| CN | 106680974 A | 5/2017 |
| CN | 104570280 B | 6/2017 |
| CN | 105467563 B | 2/2019 |
| CN | 112764200 A | 5/2021 |
| JP | S54157620 A | 12/1979 |
| JP | S59121015 A | 7/1984 |
| JP | 6165212 | 4/1986 |
| JP | S6370211 A | 3/1988 |
| JP | H0233117 A | 2/1990 |
| JP | 406059195 A | 3/1994 |
| JP | H06258702 A | 9/1994 |
| JP | H06347687 A | 12/1994 |
| JP | H07120673 A | 5/1995 |
| JP | H07325246 A | 12/1995 |
| JP | H07333505 A | 12/1995 |
| JP | H08179215 A | 7/1996 |
| JP | H09211326 A | 8/1997 |

(56) References Cited

FOREIGN PATENT DOCUMENTS

| | | |
|---|---|---|
| JP | H11223771 A | 8/1999 |
| JP | 2000131610 A | 5/2000 |
| JP | 2000292848 A | 10/2000 |
| JP | 3210242 B2 | 9/2001 |
| JP | 2002365549 A | 12/2002 |
| JP | 2003329932 A | 11/2003 |
| JP | 2004226563 A | 8/2004 |
| JP | 2004247887 A | 9/2004 |
| JP | 2004334185 A | 11/2004 |
| JP | 2006195139 A | 7/2006 |
| JP | 2007133096 A | 5/2007 |
| JP | 2007164065 A | 6/2007 |
| JP | 2007219199 A | 8/2007 |
| JP | 2007306282 A | 11/2007 |
| JP | 2008111876 A | 5/2008 |
| JP | 2008191423 A | 8/2008 |
| JP | 2010032936 A | 2/2010 |
| JP | 2010164841 A | 7/2010 |
| JP | 2011145315 A | 7/2011 |
| JP | 2011151448 A | 8/2011 |
| JP | 2012203234 A | 10/2012 |
| JP | 2012230323 A | 11/2012 |
| JP | 2013003317 A | 1/2013 |
| JP | 2013003754 A | 1/2013 |
| JP | 2013101213 A | 5/2013 |
| JP | 2013105049 A | 5/2013 |
| JP | 2013106289 A | 5/2013 |
| JP | 2013148823 A | 8/2013 |
| JP | 2014142542 A | 8/2014 |
| JP | 2017116679 A | 6/2017 |
| JP | 2018059969 A | 4/2018 |
| JP | 2019028249 A | 2/2019 |
| JP | 2019113878 A | 7/2019 |
| KR | 20080088477 A | 10/2008 |
| KR | 20090019525 A | 2/2009 |
| KR | 20090131805 A | 12/2009 |
| KR | 20110058094 A | 6/2011 |
| KR | 20110115391 A | 10/2011 |
| KR | 20120068177 A | 6/2012 |
| KR | 20140135909 A | 5/2013 |
| KR | 20140023552 A | 2/2014 |
| KR | 20160000759 A | 1/2016 |
| KR | 101632168 B1 | 6/2016 |
| KR | 20160115359 A | 10/2016 |
| TW | M602642 U | 10/2020 |
| WO | 2013058111 A1 | 4/2013 |
| WO | 2013063097 A1 | 5/2013 |
| WO | 2018130898 A1 | 7/2018 |

OTHER PUBLICATIONS

Consumer Electronic Optics: How small a lens can be? The case of panomorph lenses, Thibault et al., Sep. 2014, 7 pages.
Optical design of camera optics for mobile phones, Steinich et al., 2012, pp. 51-58 (8 pages).
The Optics of Miniature Digital Camera Modules, Bareau et al., 2006, 11 pages.
Modeling and measuring liquid crystal tunable lenses, Peter P. Clark, 2014, 7 pages.
Mobile Platform Optical Design, Peter P. Clark, 2014, 7 pages.
Boye et al., "Ultrathin Optics for Low-Profile Innocuous Imager", Sandia Report, 2009, pp. 56-56.
"Cheat sheet: how to understand f-stops", Internet article, Digital Camera World, 2017.
Husain Sumra: "Security Camera Field Of View Tips—How To Position Your Camera | Ooma", , Aug. 2, 2019 (Aug. 2, 2019), XP093206028, Retrieved from the Internet: URL:https://www.ooma.com/blog/home-security/how-to-position-your-smart-camera-for-the-best-field-of-view.

\* cited by examiner

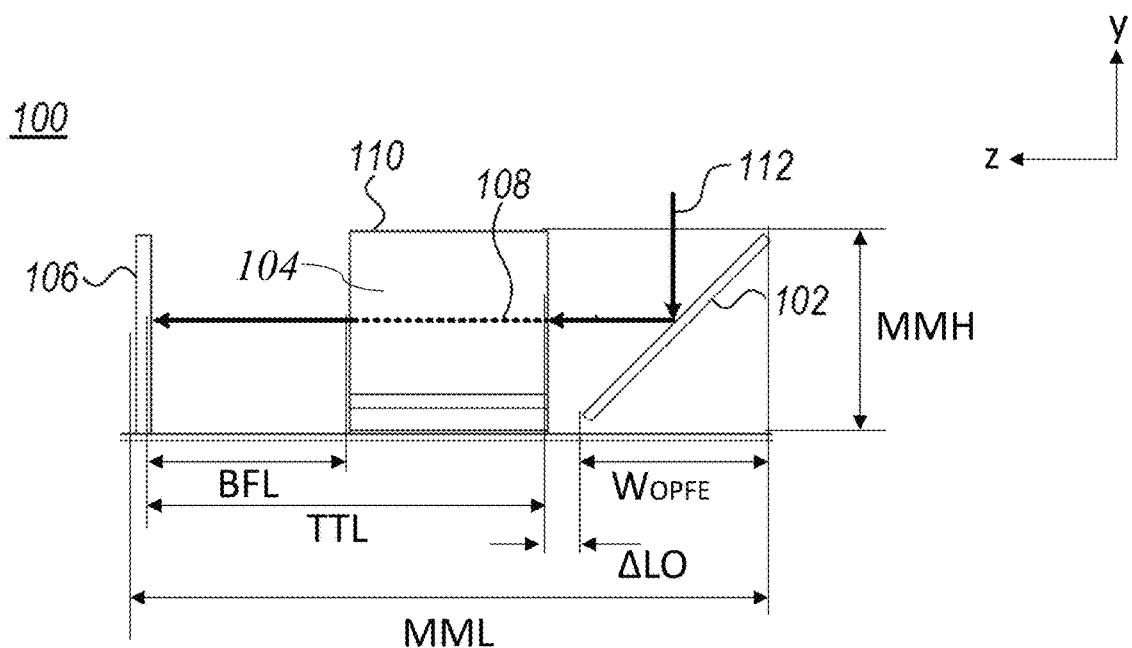
FIG. 1A   KNOWN ART
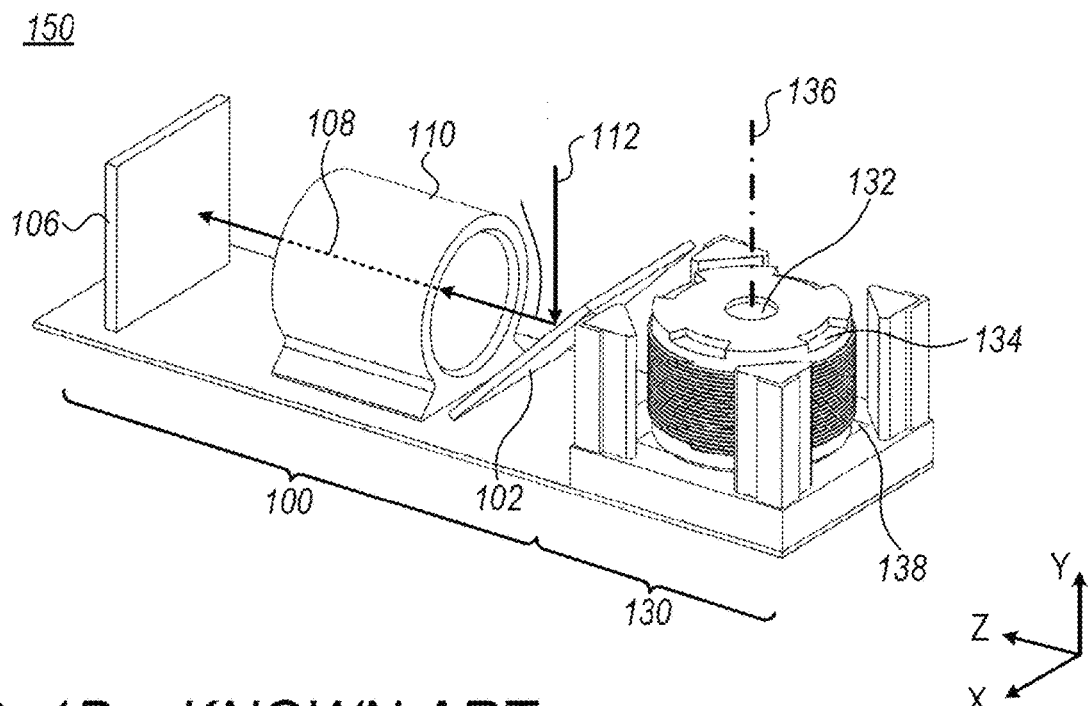
FIG. 1B   KNOWN ART

COMPACT FOLDED TELE CAMERAS

CROSS-REFERENCE TO RELATED APPLICATIONS

This is a continuation of U.S. patent application Ser. No. 18/571,742 filed Dec. 19, 2023 (now allowed), which was a 371 application from international patent application PCT/IB2022/055745 filed Jun. 21, 2022, which claims priority from US Provisional Patent Applications Nos. 63/213,899 filed Jun. 23, 2021, 63/245,892 filed Sep. 19, 2021, 63/288,047 filed Dec. 10, 2021 and 63/291,628 filed Dec. 20, 2021, all of which are expressly incorporated herein by reference in their entirety.

FIELD

The presently disclosed subject matter is generally related to the field of digital cameras.

Definitions

In this application and for optical and other properties mentioned throughout the description and figures, the following symbols and abbreviations are used, all for terms known in the art:

Total track length (TTL): the maximal distance, measured along an axis parallel to the optical axis of a lens, between a point of the front surface $S_1$ of a first lens element $L_1$ and an image sensor, when the system is focused to an infinity object distance.

Back focal length (BFL): the minimal distance, measured along an axis parallel to the optical axis of a lens, between a point of the rear surface $S_{2N}$ of the last lens element $L_N$ and an image sensor, when the system is focused to an infinity object distance.

Effective focal length (EFL): in a lens (assembly of lens elements $L_1$ to $L_N$), the distance between a rear principal point P' and a rear focal point F' of the lens.

f-number (f/ #): the ratio of the EFL to an entrance pupil diameter (or simply aperture diameter "DA").

BACKGROUND

Multi-aperture cameras (or "multi-cameras", of which a "dual-cameras" having two cameras is an example) are today's standard for portable electronic mobile devices ("mobile devices", e.g. smartphones, tablets, etc.). A multi-camera setup usually comprises a wide field-of-view (or "angle") $FOV_W$ camera ("Wide" camera or "W" camera), and at least one additional camera, e.g. with a narrower (than $FOV_W$) FOV (Telephoto or "Tele" camera with $FOV_T$), or with an ultra-wide field of view $FOV_{UW}$ (wider than $FOV_W$, "UW" camera).

FIG. 1A illustrates a known folded Tele camera 100 comprising an optical path folding element (OPFE) 102 (e.g. a prism or a mirror) having a width $W_{OPFE}$, a lens 104 with a plurality of lens elements (not visible in this representation) included in a lens barrel 110 which is located at a distance ΔLO from OPFE 102, and an image sensor 106. OPFE 102 folds an optical path (OP) from a first OP 112 to a second OP 108 that forms the optical axis of lens 104. Lens 104 is located at an image side of OPFE 102. Both the TTL and the BFL of camera 100 are oriented along one dimension parallel to OP 108. A theoretical limit for a length of a camera module ("minimum module length" or "MML") and a height of a camera module ("minimum module height" or "MMH") including camera 100 is shown. MML and MMH are defined by the smallest dimensions of the components included in camera 100. Hereinafter "MH" denotes "camera module height", or simpler just "module height". The TTL is given by TTL=MML-$W_{OPFE}$-ΔLO, so TTL is limited geometrically by TTL<MML-$L_{OPFE}$, so that a ratio of BFL/TTL is relatively small, for example 0.3 or smaller.

FIG. 1B illustrates a known dual-camera 150 that comprises folded Tele camera 100 and a (vertical or upright) Wide camera 130 including a lens 132 with a plurality of lens elements (not visible in this representation) and an image sensor 138. Lens 132 is included in a lens barrel 134. Wide camera 130 has an OP 136.

FIG. 1C shows schematically a known mobile device 160 having an exterior rear surface 162 and including a folded Tele camera 100' in a cross-sectional view. An aperture 101 of camera 100' is located at rear surface 162, a front surface 166 may e.g. include a screen (not visible). Mobile device 160 has a regular region of thickness ("T") and a camera bump region 164 that is elevated by a height B over the regular region. The bump region has a bump length ("BL") and a bump thickness T+B. Camera 100' includes an OPFE 102', a lens 104' with a plurality of lens elements and an image sensor 106'. In general and as shown here, camera 100' is entirely integrated in the bump region, so that MML and MMH define a lower limit for the bump region, i.e. for BL and T+B. For industrial design reasons, a small camera bump (i.e. a short BL) is desired. Compared to a vertical camera such as 130 and for a given bump thickness T+B, with a folded camera such as 100 one can realize larger BFL, larger TTL and, as a result, larger EFL corresponding to larger image zoom factors, which is desired. However, a large TTL goes along with a large BL, which is undesired.

As defined above, f/ #=EFL/DA. The entrance pupil is the optical image of the aperture stop, as 'seen' through the front aperture of the lens system. The front aperture is the object-sided aperture of the lens. As known, a low f/ # is desired as it has 3 major advantages: good low light sensitivity, strong "natural" Bokeh effect and high image resolution, as discussed next:

1. Low light sensitivity is a major performance drawback of today's mobile device compatible cameras when compared to e.g. digital single-lens reflex (DSLR) cameras. As an example, halving a camera's f/ #(for same EFL) increases the aperture area by a factor of 4, meaning that 4 times more light enters the camera. This difference is especially relevant when capturing low light scenes.
2. Bokeh is the aesthetic quality of the blur produced in the out-of-focus segments of an image, and it is a highly demanded feature for today's smartphones. The Bokeh effect correlates inversely with the depth of field (DOF) of an image, wherein DOF~f/ #. A low f/ #is beneficial for supporting strong "natural" Bokeh effects. As the f/ #s present in today's smartphone cameras do not provide sufficient "natural" Bokeh, the demand for strong Bokeh is answered by "artificial" Bokeh, i.e. artificially applying blur to out-of-focus image segments.
3. Image sensors with continuously increasing pixel resolution are entering mobile devices, exceeding 100 megapixel in 2019 for the first time. This (amongst other factors) is achieved by shrinking the size of single pixels, i.e. increasing the spatial pixel frequency. For translating pixel resolution to image resolution, a camera's lens must support the spatial pixel frequency $k_{pixel}$ of the sensor. For a well-designed (diffraction-limited)

camera lens, the resolvable spatial frequency of the lens $k_{Lens}$ depends inversely on the f/ #: $k_{Lens} \sim 1/f/\#$, i.e. a lower f/ # corresponds to a higher image resolution (assuming an image sensor with sufficient spatial pixel frequency).

Given a certain EFL, a large DA is desired for achieving a low f/ #.

It would be beneficial to have folded Tele cameras with large BFL/TTL ratios of 0.75 or more for providing large EFLs for large zoom factors and still supporting small camera bumps having short BL.

SUMMARY

In various exemplary embodiments, there are provided folded digital cameras, comprising: a lens with N≥3 lens elements $L_i$ and having an EFL, an aperture diameter DA, a f-number f/ #, a TTL, and a BFL, wherein each lens element has a respective focal length $f_i$ and wherein a first lens element $L_1$ faces an object side and a last lens element $L_N$ faces an image side; an image sensor having a sensor diagonal (SD); and an optical path folding element (OPFE) for providing a folded optical path between an object and the image sensor, wherein the lens is located at an object side of the OPFE, wherein the EFL is in the range of 8 mm<EFL<50 mm, and wherein a ratio between the BFL and the TTL fulfills BFL/TTL>0.75.

In various exemplary embodiments, there are provided folded digital cameras, comprising: a lens with N≥4 lens elements $L_i$ and having an EFL, an aperture diameter DA, a f-number f/ #, a TTL and a BFL, wherein each lens element has a respective focal length $f_i$ and wherein a first lens element $L_1$ faces an object side and a last lens element $L_N$ faces an image side; an image sensor having a SD; and an OPFE for providing a folded optical path between an object and the image sensor, wherein the lens is divided into a first lens group and a second lens group, wherein the first lens group is located at an object side of the OPFE, wherein the second lens group is located at an image side of the OPFE, wherein the EFL is in the range of 8 mm<EFL<50 mm, and wherein a distance d(G1-G2) between the first and the second lens group fulfills d(G1-G2)>TTL/2.

In various exemplary embodiments, there are provided folded digital cameras, comprising: a lens with N≥4 lens elements $L_1$ and having an OA, an EFL, an aperture diameter DA, a f-number f/ #, a TTL and a BFL, wherein each lens element has a respective focal length $f_i$ and wherein a first lens element $L_1$ faces an object side and a last lens element $L_N$ faces an image side; an image sensor having a SD; and an OPFE for providing a folded optical path between an object and the image sensor, the OPFE being oriented at an angle β with respect to the lens OA, wherein the lens is located at an object side of the OPFE, wherein 45<β<60 degrees, wherein the EFL is in the range of 8 mm<EFL<50 mm, and wherein SD/EFL>0.45.

In some examples, BFL/TTL>0.8. In some examples, BFL/TTL>0.9.

In some examples, BFL/EFL>0.7. In some examples, BFL/EFL>0.9.

In some examples, the EFL is in the range 15 mm<EFL<40 mm.

In some examples, the lens is movable relative to the OPFE and to the image sensor for focusing and for optical image stabilization (OIS).

In some examples, the lens and the OPFE are movable together relative to the image sensor for focusing and for OIS.

In some examples, DA is in the range 5 mm<DA<11 mm and the f/ # is in the range 2<f/ #<6.5.

In some examples, DA is in the range 7 mm<DA<9 mm and the f/ # is in the range 3<f/ #<5.5.

In some examples, the SD is in the range 3 mm<SD<10 mm.

In some examples, a folded digital camera as above or below is included in a camera module having a shoulder height (SH) and a module height (MH), wherein the SH is in the range 4 mm<SH<8 mm and the MH is in the range 6 mm<MH<12 mm. In some examples, 4.5 mm<SH<6 mm and the MH is in the range 7 mm<MH<9 mm.

In some examples, SH/MH<0.8. In some examples, SH/MH<0.7.

In some examples, a ratio of the distance ΔLO between the last surface of $L_N$ and the OPFE and the TTL fulfills ΔLO/TTL<0.01.

In some examples, a ratio between an average lens thickness (ALT) of all lens elements $L_1$-$L_i$ and the TTL fulfills ALT/TTL<0.05.

In some examples, a ratio between an average gap thickness (AGT) between all lens elements $L_1$-$L_i$ which are located on top of the lens and the TTL fulfills AGT/TTL<0.01.

In some examples, a distance $d_{34}$ between $L_3$ and $L_4$ fulfills $d_{34}$/ALT>2, wherein ALT is an average lens thickness of all lens elements $L_1$-$L_i$ which are located on an object side of the OPFE.

In some examples, EFL/TTL<1. In some examples, EFL/TTL<0.9.

In some examples, $L_1$ is made of glass.

In some examples, a ratio between $f_1$ of $L_1$ and the EFL fulfills f1/EFL>0.4.

In some examples, a ratio between $f_1$ of $L_1$ and the EFL fulfills f1/EFL>0.5.

In some examples, the last lens which is located on an object side of the OPFE is negative.

In some examples, a ratio of a distance $d_{23}$ between $L_2$ and $L_3$ and a lens thickness LT fulfills $d_{23}$/LT<0.1. In some examples, $d_{23}$/LT<0.05.

In some examples, a center thickness $T_1$ of $L_1$ is larger than a center thickness $T_i$ of any of the other lens elements $L_i$.

In some examples, a ratio between $T_1$ and the ALT of all lens elements $L_1$-$L_i$ fulfills $T_1$/ALT>1.5. In some examples, $T_1$/ALT>1.75.

In some examples, an edge thickness $ET_1$ of $L_1$ is smaller than an edge thickness $ET_j$ of a lens element $L_j$ with the largest edge thickness of all lens elements that are located at an object side of the OPFE.

In some examples, the lens is a cut lens cut along an axis parallel to a normal on the image sensor. The lens may be cut by 20% relative to an axial symmetric lens diameter and the MH may be reduced by >10% by the cutting relative to an axial symmetric lens having a same lens diameter measured along an axis which is perpendicular to the normal on the image sensor and the optical axis of the lens.

In various exemplary embodiments, there is provided a mobile device including a camera as above or below, the mobile device having a device thickness T and a camera bump with a bump height B, wherein the bump region has an elevated height T+B, wherein the camera is fully incorporated into the camera bump region. In some examples, the mobile device is a smartphone.

BRIEF DESCRIPTION OF THE DRAWINGS

Non-limiting examples of embodiments disclosed herein are described below with reference to figures attached hereto that are listed following this paragraph. The drawings and descriptions are meant to illuminate and clarify embodiments disclosed herein, and should not be considered limiting in any way.

FIG. 1A illustrates a known folded Tele camera;
FIG. 1B illustrates a known dual-camera.

DETAILED DESCRIPTION

In the following detailed description, numerous specific details are set forth in order to provide a thorough understanding. However, it will be understood by those skilled in the art that the presently disclosed subject matter may be practiced without these specific details. In other instances, well-known methods and features have not been described in detail so as not to obscure the presently disclosed subject matter.

Figure 2A:
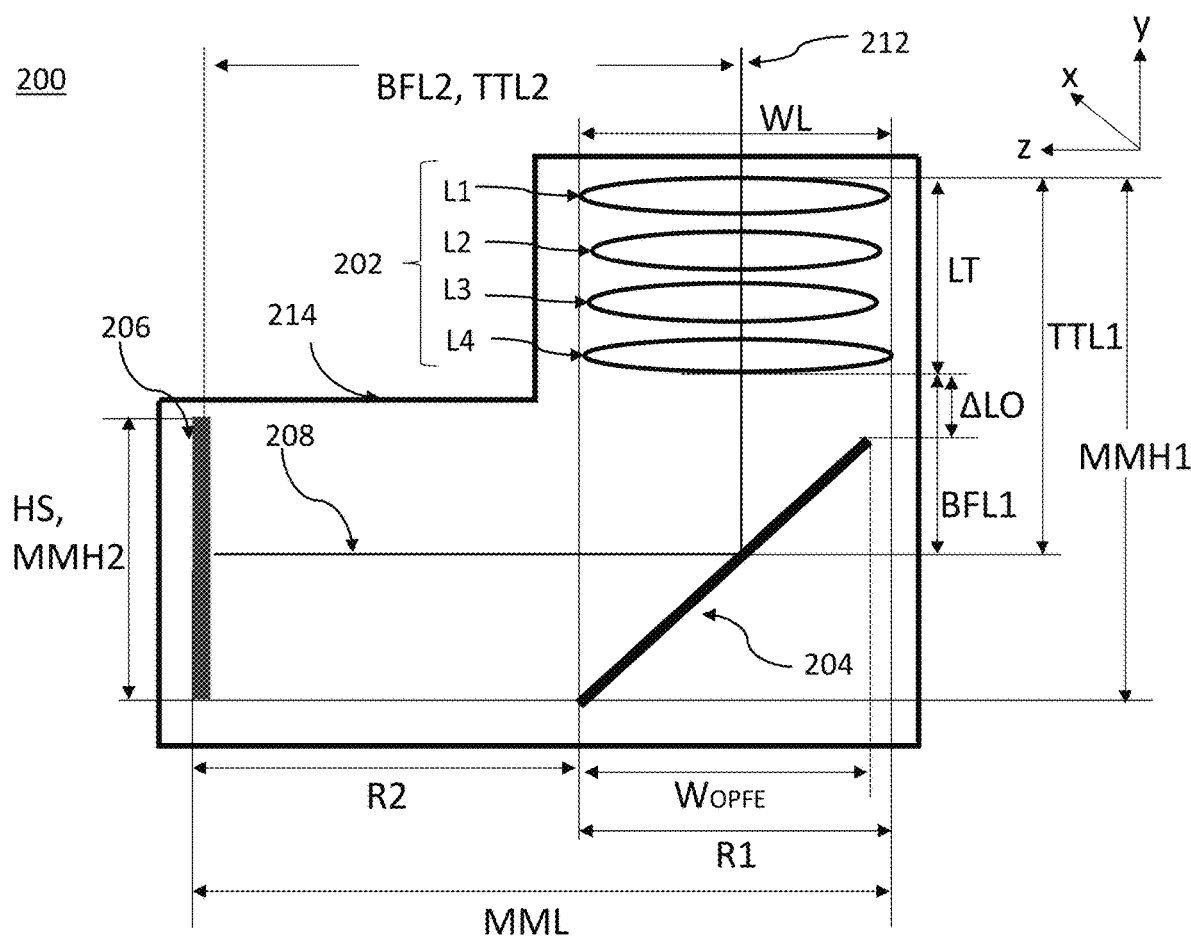
FIG. 2A shows schematically an embodiment of a folded Tele camera disclosed herein.

FIG. 2A shows schematically an embodiment of a folded Tele camera disclosed herein and numbered 200. Camera 200 comprises a lens 202 with a plurality of N lens elements (here N=4) numbered $L_1$-$L_4$, with $L_1$ being oriented towards an object side. Camera 200 further comprises an OPFE 204 that folds OP 212 to OP 208 and an image sensor 206. The camera elements may be included in a housing 214, as shown. In camera 200, OP 212 is substantially parallel to the y-axis and OP 208 is substantially parallel to the z-axis. OPFE 204 forms an angle of 45 degrees with both the y-axis and the z-axis.

For estimating theoretical limits for minimum dimensions of a camera module that includes optical lens systems such as presented in FIGS. 3A-3D, we introduce the following parameters and interdependencies:

MML and "Module Length" ("ML")
  Minimum module length ("MML") is the theoretical limit for a length of a camera module that includes all components of camera 200.
  MML=max($Z_{Lens}$, $Z_{OPFE}$)–$Z_{Sensor}$, max($Z_{Lens}$, $Z_{OPFE}$) being the maximum z-value of lens 202 ($Z_{Lens}$) or OPFE 204 ($Z_{OPFE}$) and $Z_{sensor}$ being the minimum z-value of image sensor 206. In some embodiments and as shown in FIG. 2A, $Z_{Lens}$>$Z_{OPFE}$, so that MML=$Z_{Lens}$–$Z_{Sensor}$.
  For achieving a realistic estimation for a camera module length "ML"), one may add for example a length of 3.5 mm to MML, i.e. ML=MML+3.5 mm. The additional length accounts for a lens stroke that may be required for OIS as well as for image sensor packaging, housing, etc.

R1
  A first region ("R1") of MML, associated with a first minimum module height MMH1.
  R1=max(WL, $W_{OPFE}$), where WL is the width of lens 202 measured along the z-axis, and $W_{OPFE}$ is the width of OPFE 204 measured along the z-axis. In some embodiments and as shown in FIG. 2A, WL>$W_{OPFE}$, so that R1 is determined solely by lens 202 and R1=WL.
  One distinguishes between an optical lens width ("$WL_O$") and a mechanical lens width ("$WL_M$").
  One distinguishes between a width of OPFE 204 obtained by including all on-axis rays ("$W_{OPFE-ON}$") vs. a width obtained by including all off-axis rays ("$W_{OPFE-OFF}$").

R2
  A second region ("R2") of MML that is associated with a second minimum module height MMH2, wherein MMH2<MMH1.
  R2=MML–R1.
  In general and for a given MML, from an industrial design point of view it may be beneficial to maximize R2 (minimize R1).

MMH1 and "Module Height" ("MH")
  MMH1=$H_{OPFE}$+ΔLO+LT, $H_{OPFE}$ being the height of OPFE 204 (we assume OPFE 204 is oriented at 45 degree with respect to both the y-axis and the z-axis, so that $H_{OPFE}$=$W_{OPFE}$), ΔLO being the distance between the center of lens 202 and OPFE 204 and LT being the height (or "thickness") of lens 202.
  For achieving a realistic estimation for a camera module height, we calculate MH by adding an additional height of 1.5 mm to MMH1, i.e. MH=MMH1+1.5 mm. The additional length accounts for a lens stroke that may be required for AF as well as housing, lens cover etc.

One distinguishes between a MMH1 obtained by including all on-axis rays ("MMH1$_{ON}$") vs. a height obtained by including all off-axis rays ("MMH1$_{OFF}$"). MH$_{ON}$ and MH$_{OFF}$ are the MHs obtained by including all on-axis rays and by including all off-axis rays ("MMH1$_{OFF}$") respectively. MH$_{ON}$ and MH$_{OFF}$ are calculated by using MMH1$_{ON}$ and MMH1$_{OFF}$ respectively.

In other examples, e.g. with an image sensor 206 occupying a lower y-value than OPFE 204, MMH1 may be MMH1>H$_{OPFE}$+ΔLO+LT. In these examples, MMH1 is given by the difference between the lowest y-values occupied by image sensor 206 and the highest y-value occupied by lens 202.

MMH2 and "Shoulder Height" ("SH")

A second minimum module height ("MMH2") is the theoretical limit for a height of a camera module that includes all components of camera 200 in a second region ("R2"). MMH2=min(HS, H$_{OPFE}$), HS being the height of image sensor 206 and H$_{OPFE}$ being the height of OPFE 204. Image sensor 206 may have a width:height ratio of 4:3, so that a sensor diagonal (SD) is given by SD=5/3·HS.

In some embodiments and as shown in FIG. 2A, MMH2 may be determined solely by image sensor 206, i.e. MMH2=HS.

For achieving a realistic estimation for a real camera module height, shoulder height SH is calculated by adding an additional height of, for example, 1.5 mm to MMH2, i.e. SH=MMH2+1.5 mm. The additional height accounts for contacting sensor 206 as well as for housing.

B$_{Min}$

A theoretical minimum for a height B of a camera bump such as 164 or 234.

B$_{Min}$=MMH1−T. For calculating B$_{Min}$ in Table 1 and Table 12, we assume a device thickness T=7 mm.

B$_{Min\text{-}ON}$ and B$_{Min\text{-}OFF}$ are calculated by using MMH1$_{ON}$ and MMH1$_{OFF}$ respectively.

In comparison with known camera 100 and for a given MML, camera 200 may have larger TTL and BFL. A larger TTL is beneficial for achieving a Tele camera with a large EFL and thus a high zoom factor (ZF), or image magnification factor as known in the art. In general, a Tele camera's ZF is defined with respect to a (vertical or upright) Wide camera such as Wide camera 130 that is included in a multi-camera alongside the Tele camera.

Lens 202 is located at an object side of OPFE 204. Therefore, both the TTL and the BFL of camera 200 are oriented not along one dimension, but along two dimensions. A first part TTL$_1$ and BFL$_1$ is parallel to OP 212, and a second part TTL$_2$ and BFL$_2$ is parallel to OP 208. TTL and BFL are obtained by TTL=TTL$_1$+TTL$_2$ and BFL=BFL$_1$+BFL$_2$, wherein TTL$_2$=BFL$_2$. Therefore, TTL is not limited geometrically by TTL<MML−W$_{OPFE}$, so that a ratio of BFL/TTL can be significantly higher than for camera 100. In camera 200, for example, BFL/TTL=0.9. Lens thickness LT of lens 202 is given by LT=TTL$_1$−BFL$_1$.

Another advantage of lens 202 being located at an object side of OPFE 204 is that a large aperture diameter ("DA") can be achieved. This is because, opposite to a known folded camera such as 100, the optical power of lens 202 concentrates the light before it impinges on OPFE 204, not after it impinges on an OPFE. "Concentrating the light" means here that a first circle which is oriented perpendicular to the optical axis of the lens and includes all light rays that form an image at the image sensor, the first circle being located at an object side of the lens, is smaller than a second circle which is oriented perpendicular to the optical axis of the lens and includes all light rays that form an image at the image sensor, the second circle being located at an image side of the lens and at an object side of the OPFE. Therefore, given a size of an OPFE such as OPFE 102 or OPFE 204, compared to known camera 100, in camera 200 a larger DA (and thus lower f/#) can be achieved.

An optical lens system such as optical lens systems 310, 320 and 330 may be included in camera 200.

Figure 2B:
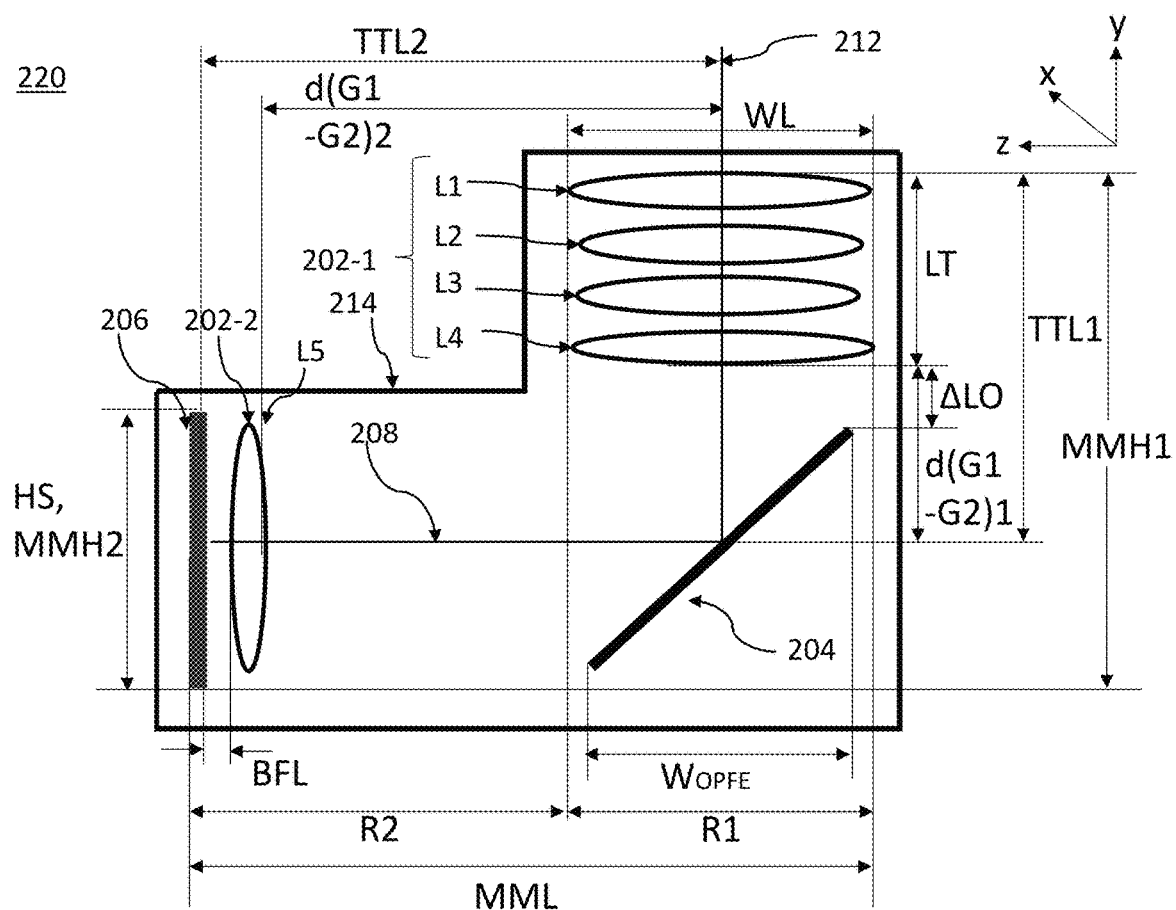
FIG. 2B shows schematically another embodiment of a folded Tele camera disclosed herein.

FIG. 2B shows schematically another embodiment of a folded Tele camera disclosed herein and numbered 220. Camera 220 comprises a lens 202 with a plurality of N lens elements (here: N=5) numbered L$_1$-L$_5$, which is divided in two lens groups, a first group 202-1 ("G1") that includes L$_1$-L$_4$ and which is located at an object side of the OPFE, and a second lens group 202-2 ("G2") that includes L$_5$ and which is located at an image side of the OPFE. A distance d(G1-G2) between G1 and G2 is given by d(G1-G2)=d(G1-G2)$_1$+d(G1-G2)$_2$, wherein d(G1-G2)$_1$ is oriented along OP 212 and d(G1-G2)$_2$ is oriented along OP 208 As in camera 200, TTL$_1$ is parallel to OP 212, TTL$_2$ is parallel to OP 208 and TTL=TTL$_1$+TTL$_2$.

However, BFL is not divided into two perpendicular components. All further components of camera 220 are identical with the ones in camera 200. In some embodiments (for example embodiment 300), an optical element (not shown) such as an IR filter may be located between OPFE 204 and G2 202-2. In other embodiments, an optical element may be located between G2 202-2 and image sensor 206. An optical lens system such as optical lens system 300 may be included in camera 220.

Figure 1C:
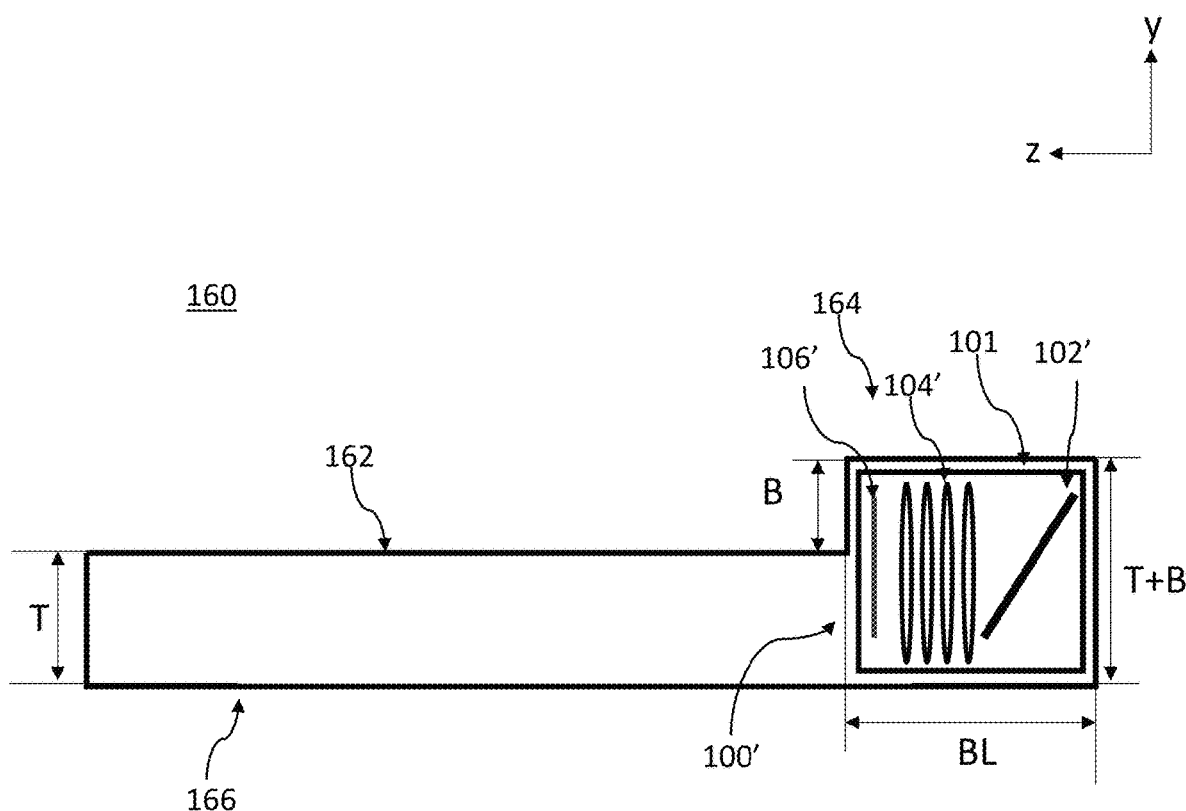
FIG. 1C shows schematically a known mobile device having an exterior surface and including a folded Tele camera.
Figure 2C:
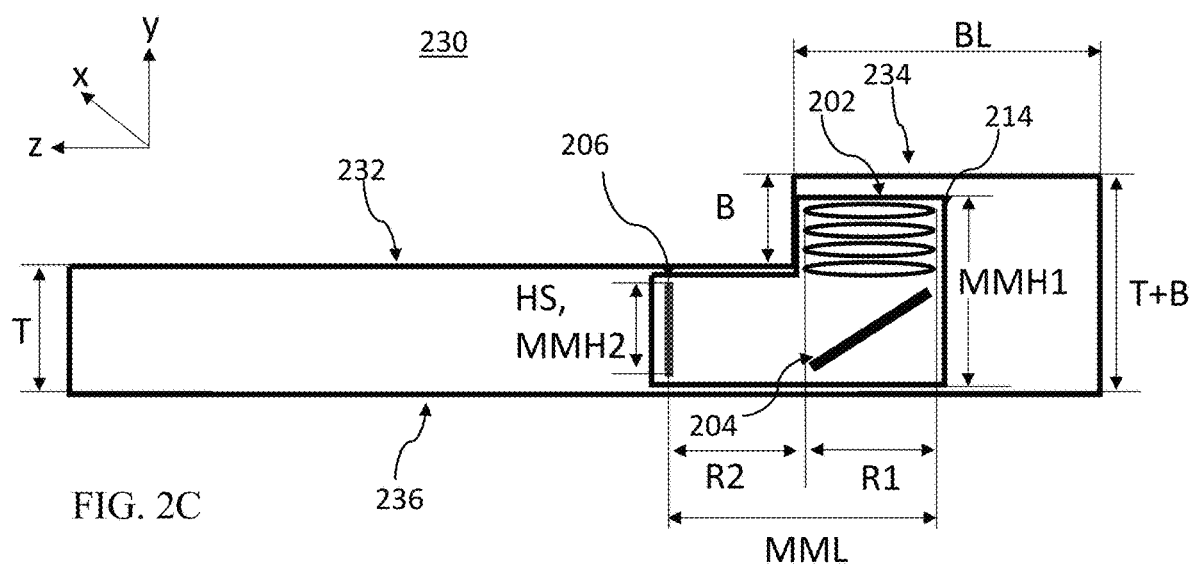
FIG. 2C shows schematically a mobile device with dimensions as described in FIG. 1C having an exterior surface and including a folded Tele camera as in FIG. 2A in a cross-sectional view.

FIG. 2C shows schematically a mobile device 230 (e.g. a smartphone) with dimensions as described in FIG. 1C having an exterior surface 232 and including a folded Tele camera 200 as disclosed herein in a cross-sectional view. A camera bump region is marked 234. A front surface 236 may e.g. include a screen (not visible). R1 of camera 200 is integrated into 234 of height T+B, while R2 of camera 200 is integrated into the regular device region of height T. In comparison with mobile device 160, where camera 100' is entirely integrated into the bump region, mobile device 230, where camera 200 is integrated in the bump region only partially, can have a smaller BL, what is beneficial for industrial design reasons. In other embodiments, another folded Tele camera such as folded Tele camera 220 as disclosed herein may be included in mobile device 230. In general and for slim mobile devices, it is beneficial to minimize MMH1 and MMH2. Especially minimizing MMH1 is of interest, as it allows minimizing B. For compact camera, also minimizing MML is beneficial. Especially minimizing R1 is of interest, as it allows minimizing BL.

Figure 2D:
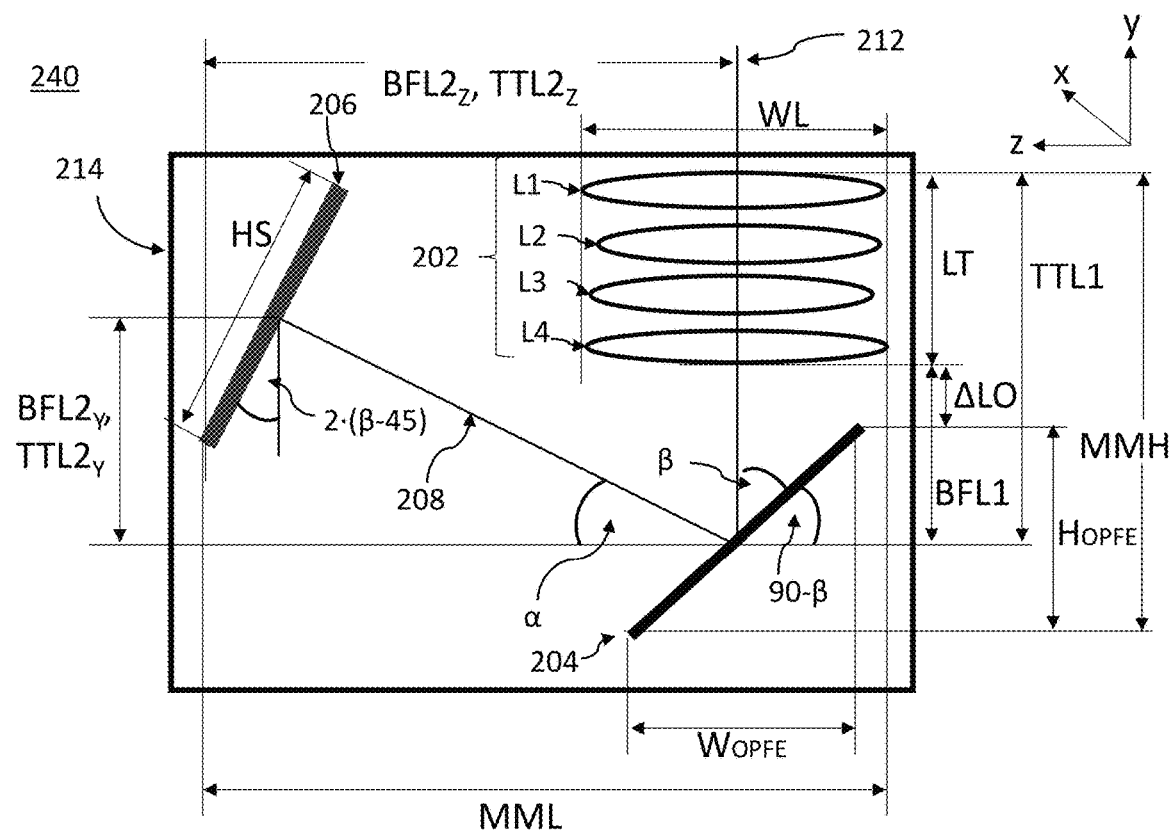
FIG. 2D shows schematically another embodiment of a folded Tele camera disclosed herein.

FIG. 2D shows schematically an embodiment of a folded Tele camera disclosed herein and numbered 240. Camera 240 comprises a lens 202 with a plurality of N lens elements (here N=4) numbered L$_1$-L$_4$, with L$_1$ being oriented towards an object side. Camera 240 further comprises an OPFE 204 that folds OP 212 to OP 208 and an image sensor 206. The camera elements may be included in a housing 214, as shown. In camera 240, OP 212 is substantially parallel to the y-axis. OP 208 forms an angle α with the z-axis, so to OP 208 it is referred to as a "sloped OP". OPFE 204 forms an angle β of β>45 degrees with the y-axis and an angle 90−β<45 degrees with the z-axis. As of OP 208's slope, BFL$_2$ and TTL$_2$ respectively have a component measured along the y-axis ("TTL2$_y$", "BFL2$_y$") and a component measured along the z-axis ("TTL2$_z$", "BFL2$_z$"), so that e.g.

$BFL_2=\sqrt{BFL2_y^2+BFL2_z^2}$. As of the sloped OP, sensor 206 forms an angle of $2\times(\beta-45)$ with the y-axis.

Advantages of such a camera with sloped OP are:
1. Incorporation of large image sensors, e.g. 1/2" or larger.
2. A more compact module size, i.e. MMH and MML can be smaller with respect to a camera with a non-sloped OP (assuming identical EFL, lens aperture and image sensor sizes for the cameras with sloped and non-sloped OP respectively).

Figure 3A:
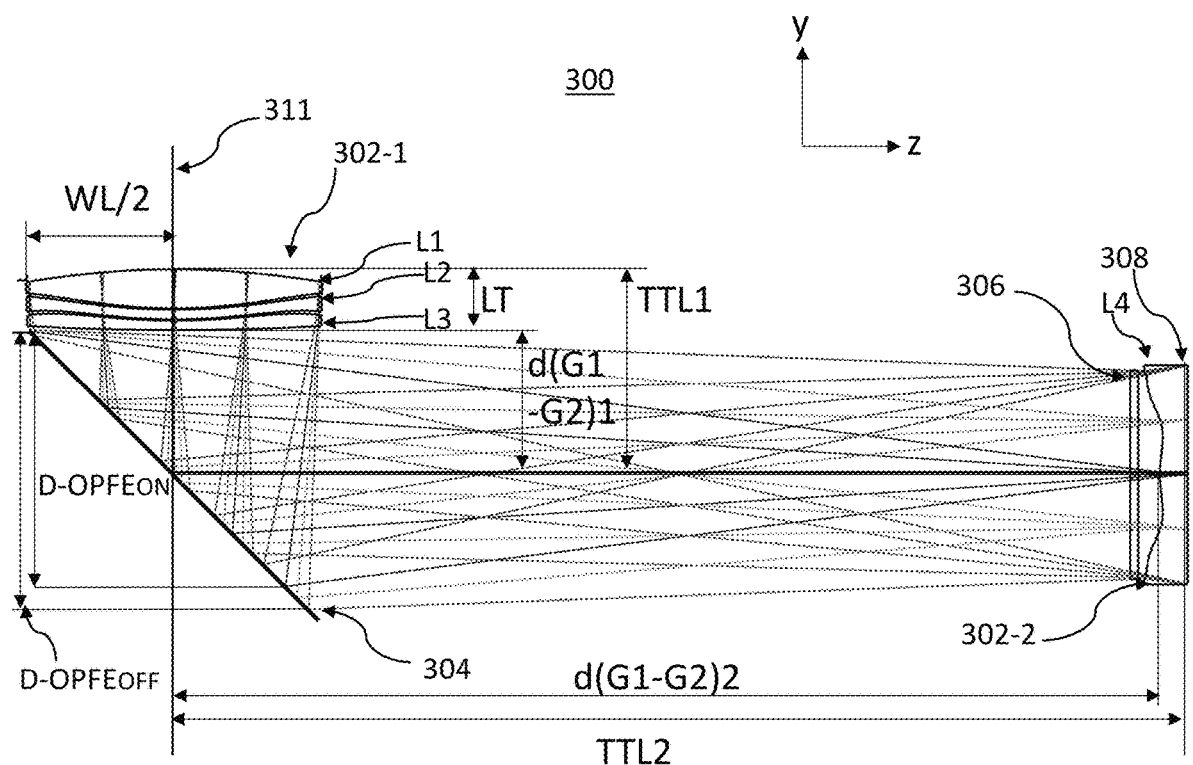
FIG. 3A shows schematically an embodiment of an optical lens system disclosed herein.
Figure 3B:
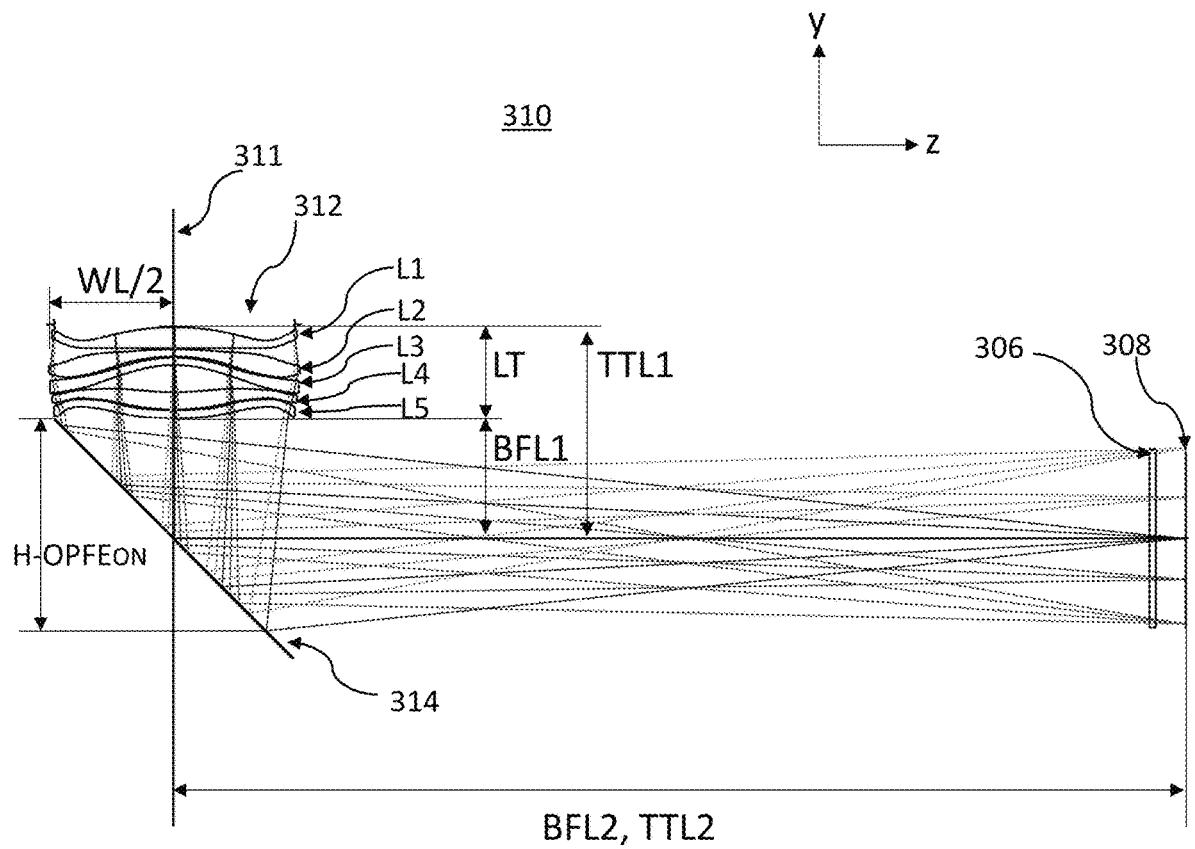
FIG. 3B shows schematically another embodiment of an optical lens system disclosed herein.
Figure 3C:
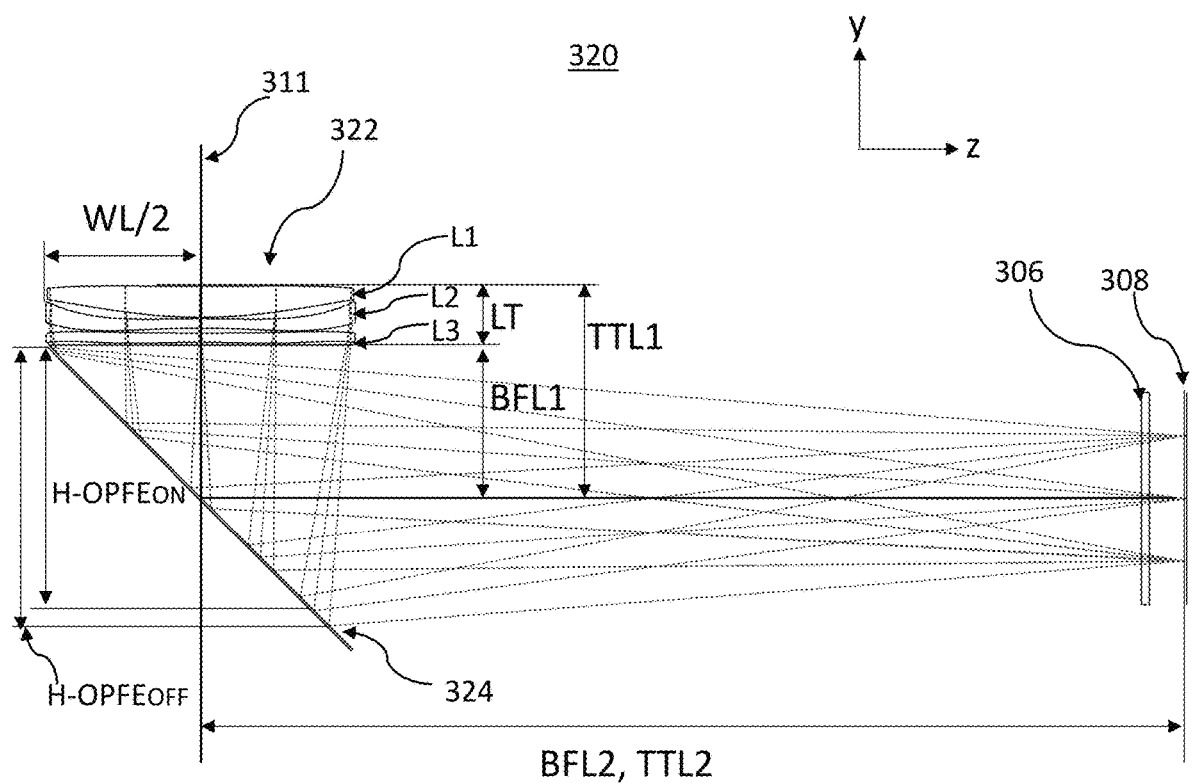
FIG. 3C shows schematically yet another embodiment of an optical lens system disclosed herein.
Figure 3D:
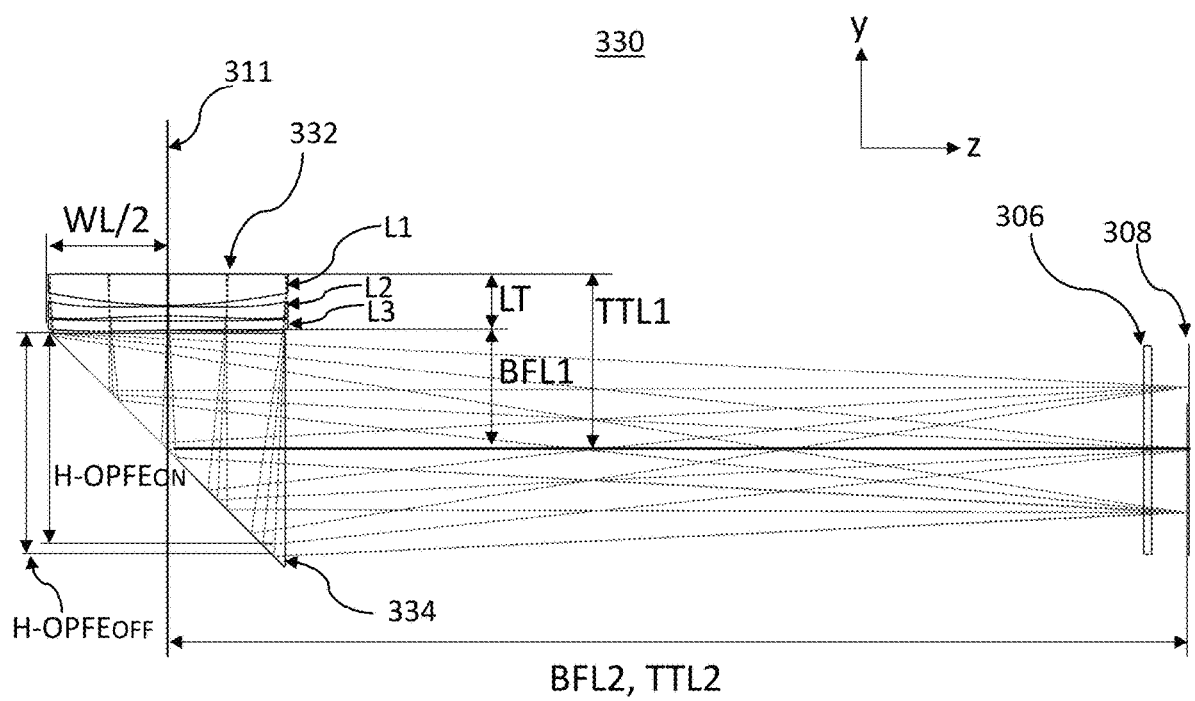
FIG. 3D shows schematically yet another embodiment of an optical lens system disclosed herein.
Figure 3E:
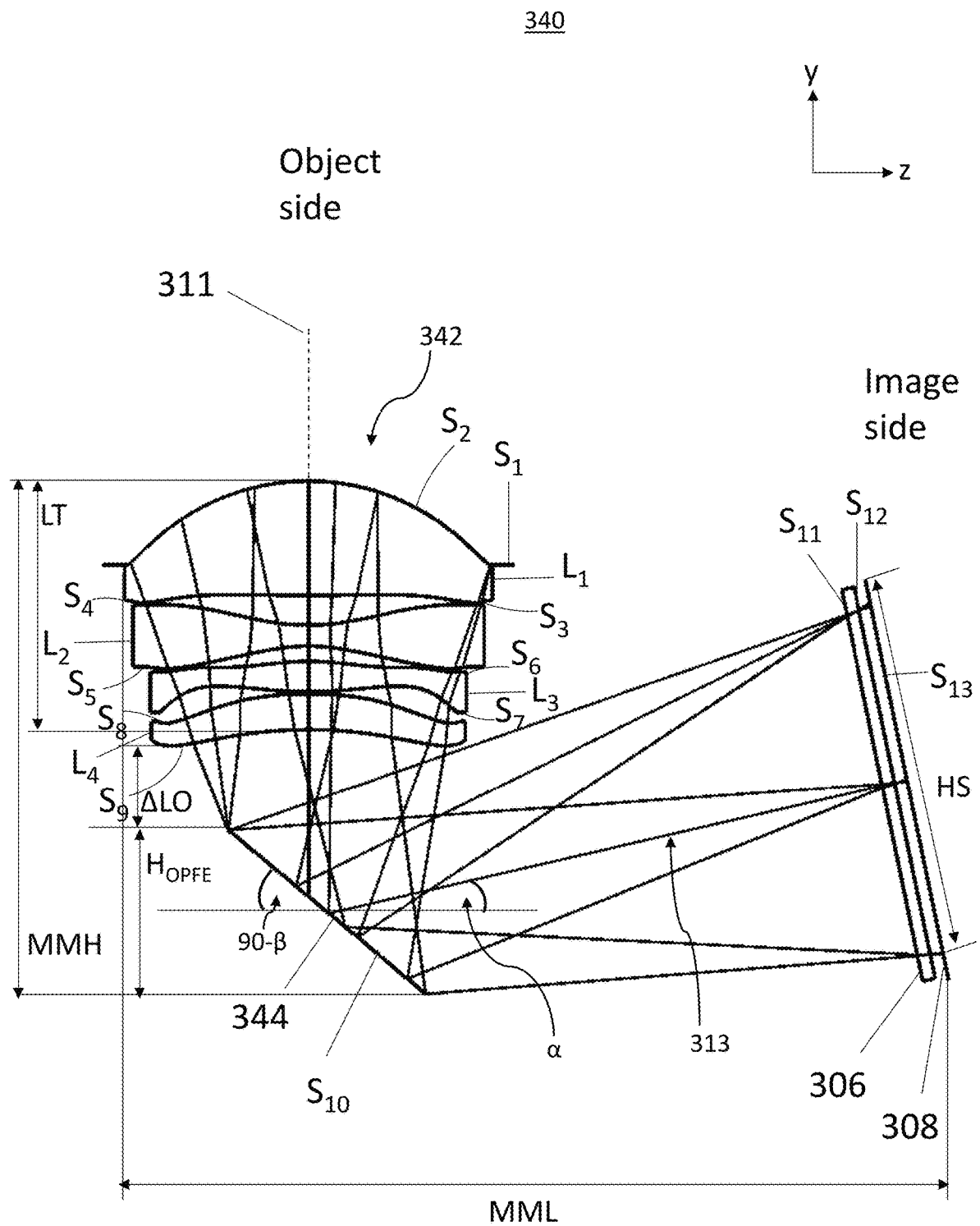
FIG. 3E shows schematically yet another embodiment of an optical lens system disclosed herein.

For estimating theoretical limits for minimum dimensions of a camera module that includes optical lens systems such as presented in FIG. 3E, we introduce the following parameters and interdependencies:

MML and "Module Length" ("ML")

Minimum module length ("MML") is the theoretical limit for a length of a camera module that includes all components of camera 240.

MML=$\max(Z_{Lens}, Z_{OPFE})-Z_{sensor}$, $\max(Z_{Lens}, Z_{OPFE})$ being the maximum z-value of lens 202 ($Z_{Lens}$) or OPFE 204 ($Z_{OPFE}$) and $Z_{sensor}$ being the minimum z-value of image sensor 206. In some embodiments and as shown in FIG. 2D, $Z_{Lens}>Z_{OPFE}$, so that MML=$Z_{Lens}-Z_{sensor}$.

For achieving a realistic estimation for a camera module length ("ML"), one may add for example a length of 3.5 mm to MML, i.e. ML=MML+3.5 mm. The additional length accounts for a lens stroke that may be required for OIS as well as for image sensor packaging, housing, etc.

MMH and "Module Height" ("MH")

MMH=$H_{OPFE}+\Delta LO+LT$, $H_{OPFE}$ being the height of OPFE 204 (as of sloped OP 208, $H_{OPFE} \neq W_{OPFE}$).

For achieving a realistic estimation for a camera module height, we calculate MH by adding an additional height of 1.5 mm to MMH, i.e. MH=MMH+1.5 mm.

Figure 2E:
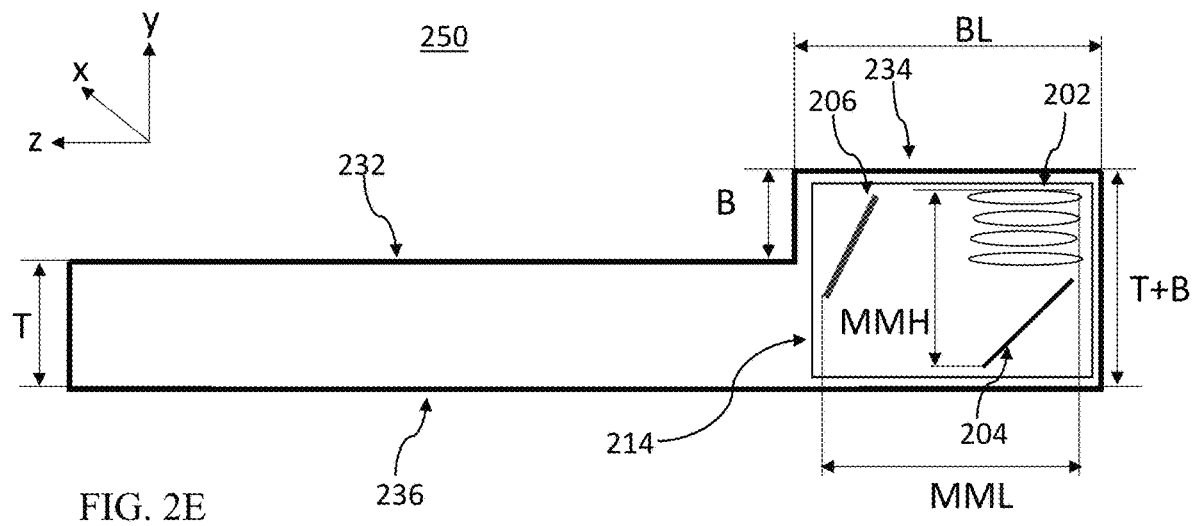
FIG. 2E shows schematically another mobile device with dimensions as described in FIG. 1C and including a folded Tele camera as in FIG. 2D in a cross-sectional view.

An optical lens system such as optical lens system 340 may be included in camera 240. FIG. 2E shows schematically a mobile device 250 (e.g. a smartphone) with dimensions and components as described in FIG. 1C and FIG. 2C including a folded Tele camera 240 as disclosed herein in a cross-sectional view. Camera 240 is fully integrated into camera bump 234.

Figure 2F:
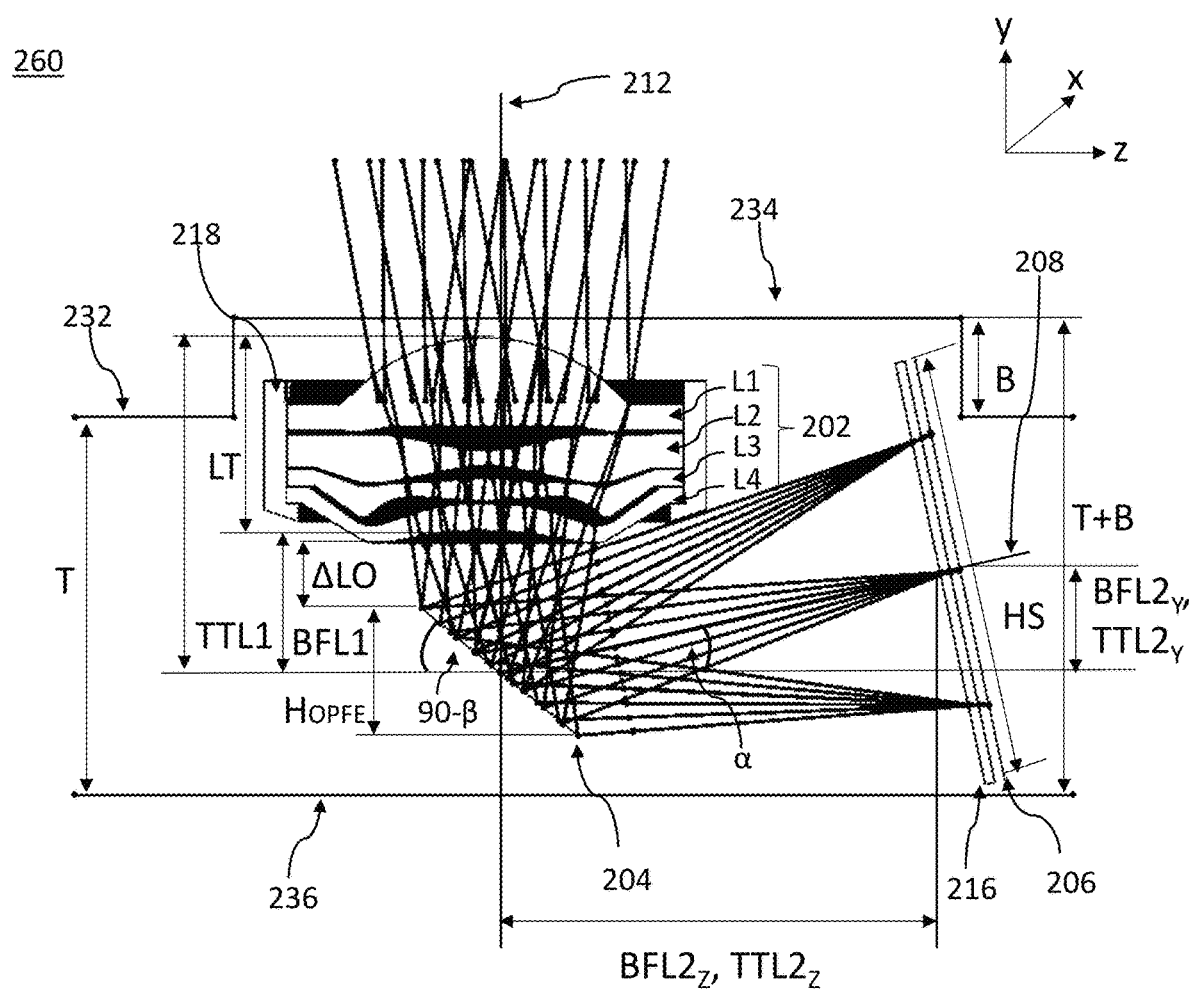
FIG. 2F shows schematically a yet another mobile device with dimensions as described in FIG. 1C and including a folded Tele camera as in FIG. 2D in a cross-sectional view.

FIG. 2F shows schematically another mobile device 260 with dimensions and components as described in FIG. 1C, FIG. 2C, FIG. 2D and FIG. 2E including a folded Tele camera 240 as disclosed herein in a cross-sectional view. Camera 240 is fully integrated into camera bump 234. OP 208 is a sloped OP that forms an angle $\alpha$ with the z-axis. The lens elements of lens 202 are carried by lens barrel 218.

Figure 2G:
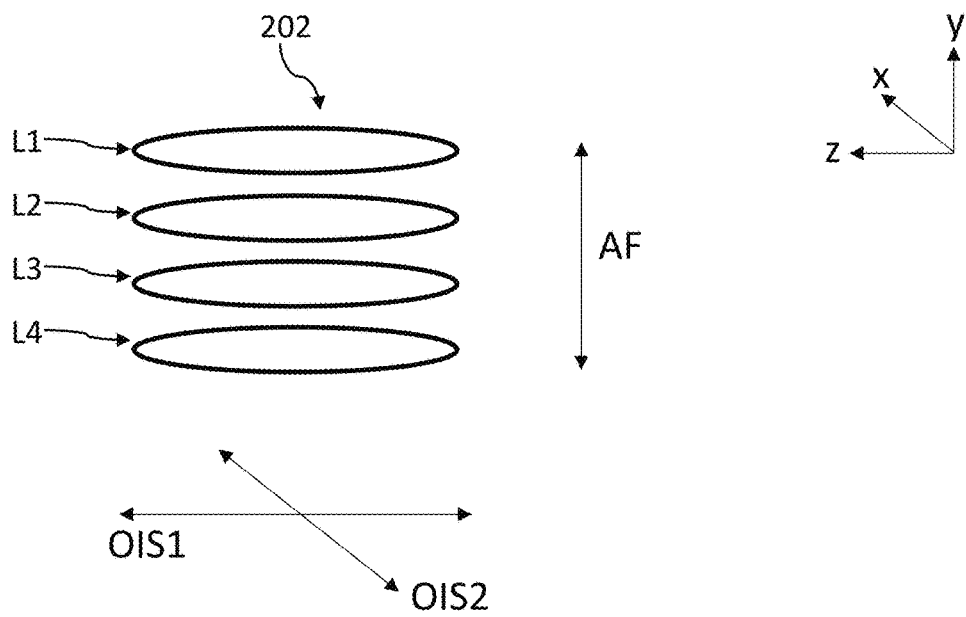
FIG. 2G shows an embodiment of an autofocus (AF) and optical image stabilization (OIS) mechanism for the folded cameras of FIG. 2A and FIG. 2D.

FIG. 2G shows an embodiment of a first autofocus (AF) and optical image stabilization (OIS) mechanism disclosed herein for camera 200 and camera 240. Lens 202 is shown in a same orientation as in FIGS. 2A-F. Lens 202 is moved relative to the OPFE and to the image sensor (both not shown) along an axis parallel to the y-axis for AF, along a first OIS axis ("OIS1") parallel to the z-axis for OIS along a first axis, and along a second OIS axis ("OIS2") parallel to the x-axis for OIS along a second axis. Lens 202 is moved as one unit, i.e. the distances between the N lens elements (here $L_1$-$L_4$) do not change, but the distances to the OPFE and to the image sensor do change (both not shown).

Figure 2H:
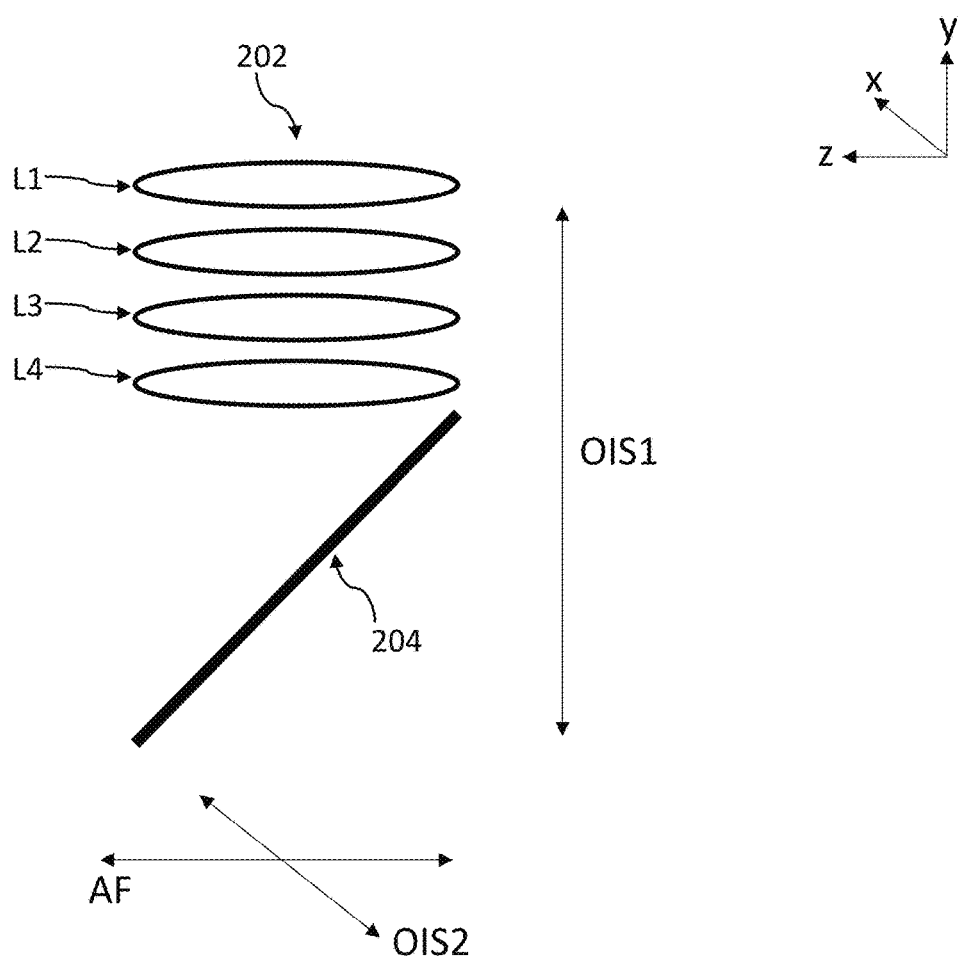
FIG. 2H shows another embodiment of an AF and OIS mechanism for the folded cameras of FIG. 2A.

FIG. 2H shows another embodiment of a second AF and OIS mechanism disclosed herein for camera 200. Lens 202 and OPFE 204 are shown in a same orientation as in FIGS. 2A-F. Lens 202 and OPFE 204 are moved as one unit relative to the image sensor (not shown) along an axis parallel to the z-axis for AF, and along a first OIS axis ("OIS1") parallel to the y-axis for OIS along a first axis, and along a second OIS axis ("OIS2") parallel to the x-axis for OIS along a second axis. Moving lens 202 and OPFE 204 as one unit means that the distances between the N lens elements (here $L_1$-$L_4$) and between lens 202 and OPFE 204 do not change. Only the distance to the image sensor (not shown) changes.

Figure 2I:
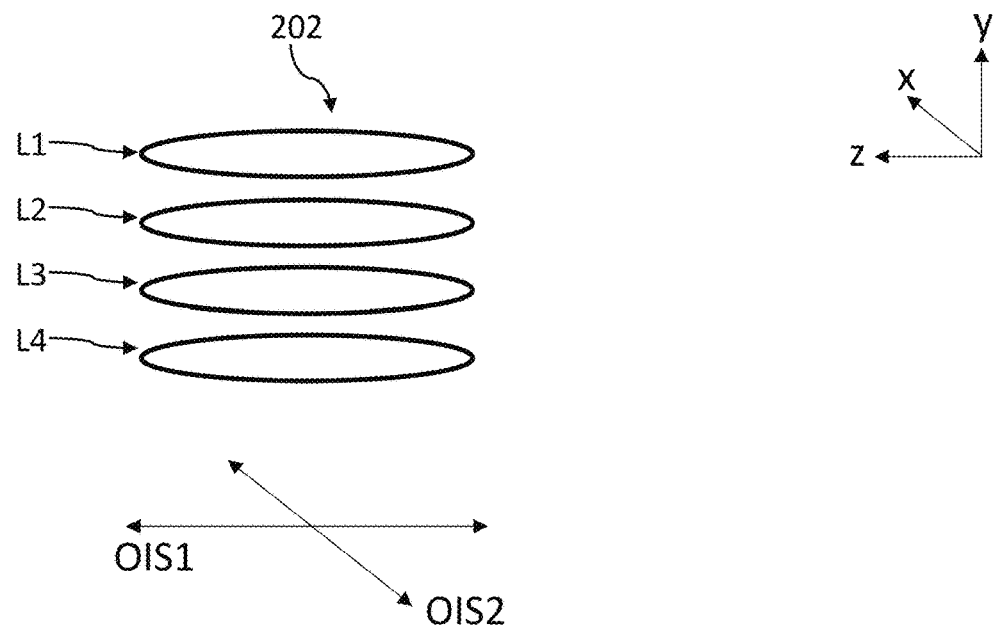
FIG. 2I shows yet another embodiment of an AF and OIS mechanism for the folded cameras of FIG. 2A.
Figure 2I:
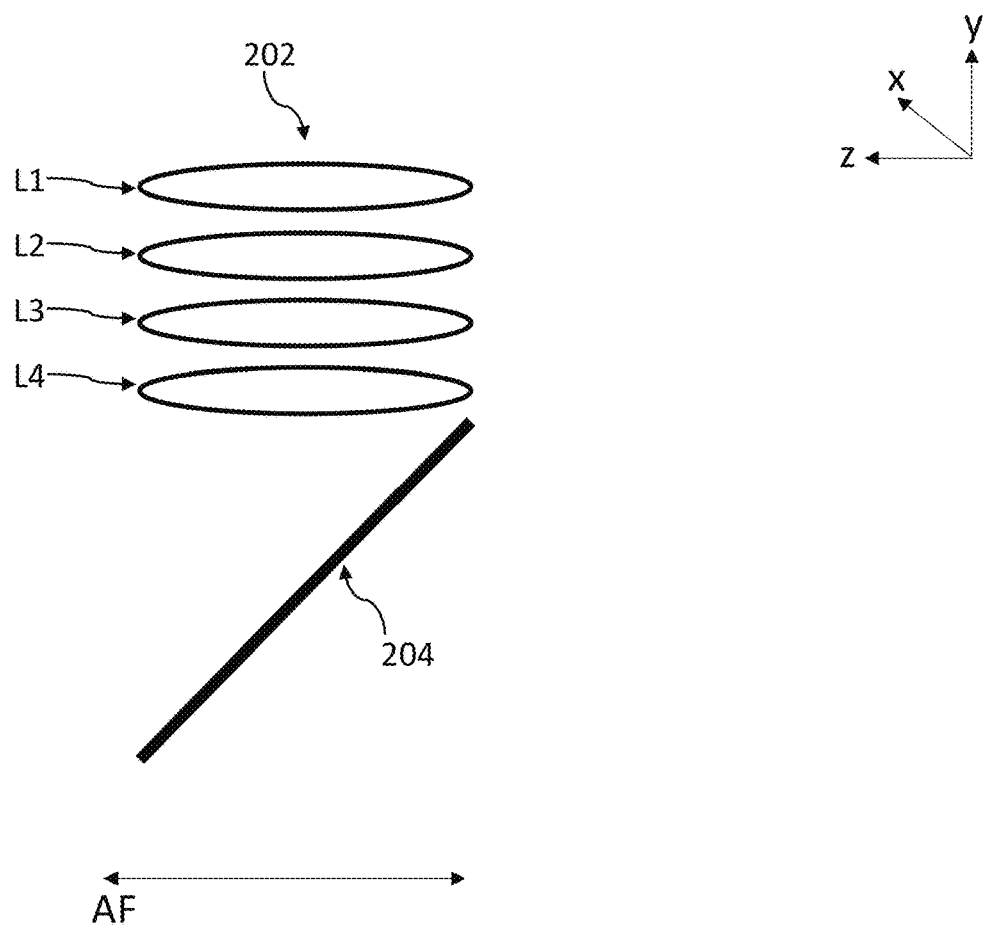

FIG. 2I shows yet another embodiment of a third AF and OIS mechanism disclosed herein for camera 200. Lens 202 and OPFE 204 are shown in a same orientation as in FIGS. 2A-F. Lens 202 is moved relative to the OPFE and to the image sensor (not shown) along a first OIS axis ("OIS1") parallel to the z-axis for OIS along a first axis, and along a second OIS axis ("OIS2") parallel to the x-axis for OIS along a second axis. For AF, Lens 202 and OPFE 204 are moved as one unit relative to the image sensor (not shown) along an axis parallel to the z-axis. It is noted that no movement along the y-axis is associated to performing AF and OIS according to the third AF and OIS mechanism. This means that, in first order, no additional height penalty (measured along an axis parallel to the y-axis) is associated with performing AF and OIS according to the third AF and OIS mechanism, or in other words, performing AF and OIS according to the third AF and OIS mechanism does only slightly increase MMH1. "In first order, no additional height penalty" and "only slightly, increase MMH1" refers to the fact that no movement along the y-axis is required. However, embodiments that use the third AF and OIS mechanism may require a slightly larger OPFE 204 than embodiments that use the second AF and OIS mechanism. This is because for implementing the third AF and OIS mechanism, OPFE 204 must be slightly larger along the X-Z plane so that rays passing lens 202 at all possible OIS positions still incident on OPFE 204 and can contribute to an image formed at the image sensor.

Figure 2J:
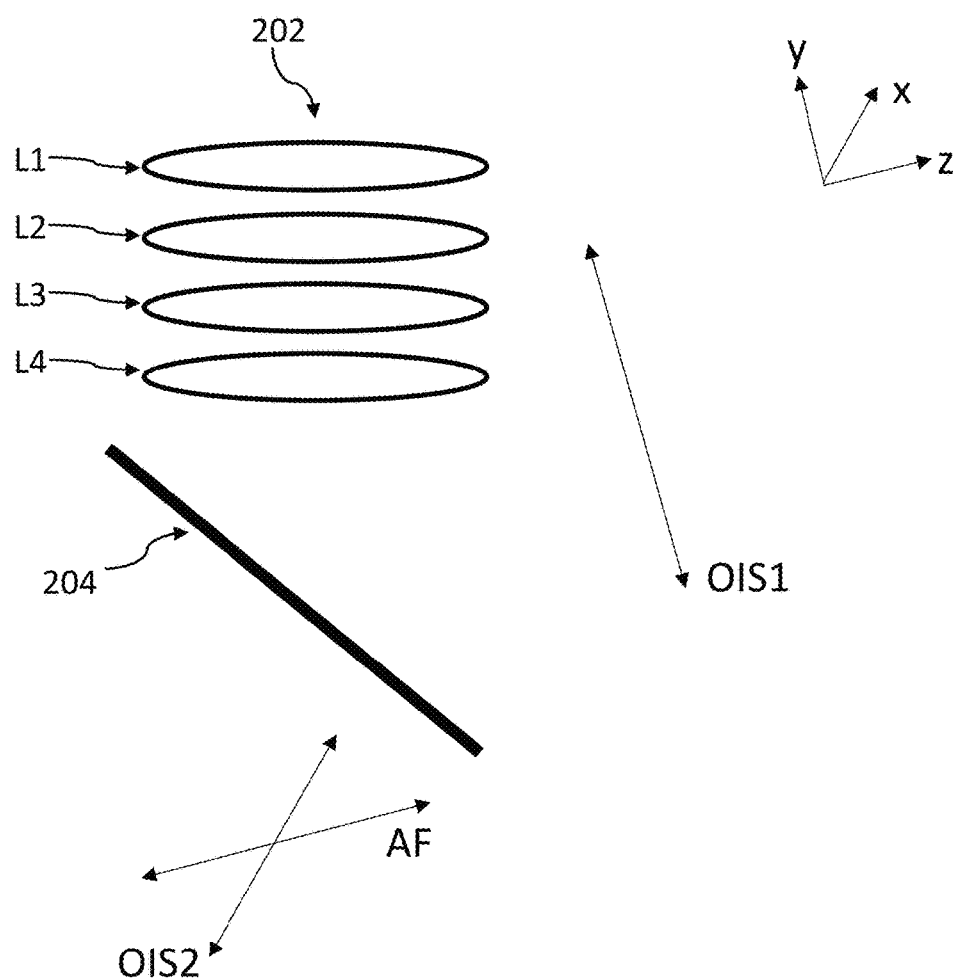
FIG. 2J shows yet another embodiment of an AF and OIS mechanism for the folded cameras of FIG. 2D.

FIG. 2J shows an embodiment of a second AF and OIS mechanism described herein for camera 240. Lens 202 and OPFE 204 are shown in a same orientation as in FIGS. 2D-2F, but the shown coordinate system has a different orientation. The coordinate system is rotated (around the x-axis) so that its z-axis is substantially parallel to OP 208. Lens 202 and OPFE 204 are moved as one unit relative to the image sensor (not shown) along an axis parallel to the z-axis for AF, and along a first OIS axis ("OIS1") parallel to the y-axis for OIS along a first axis, and along a second OIS axis ("OIS2") parallel to the x-axis for OIS along a second axis. Moving lens 202 and OPFE 204 as one unit means that the distances between the N lens elements (here $L_1$-$L_4$) and between lens 202 and OPFE 204 do not change. Only the distance to the image sensor (not shown) changes.

The differences between the embodiment of a second AF and OIS mechanism for camera 200 (see FIG. 2H) and the embodiment of a second AF and OIS mechanism for camera 240 (see FIG. 2J) are based on the following. For performing AF, the motion of the image plane must be perpendicular to the image sensor plane. This is achieved by moving lens 202 and OPFE 204 together relative to the image sensor along an axis perpendicular to the image sensor plane. For performing OIS, the motion of the image plane must be parallel to the image sensor plane. This is achieved by moving lens 202 and OPFE 204 together relative to the image sensor along an axis parallel to the image sensor plane.

Figure 2K:
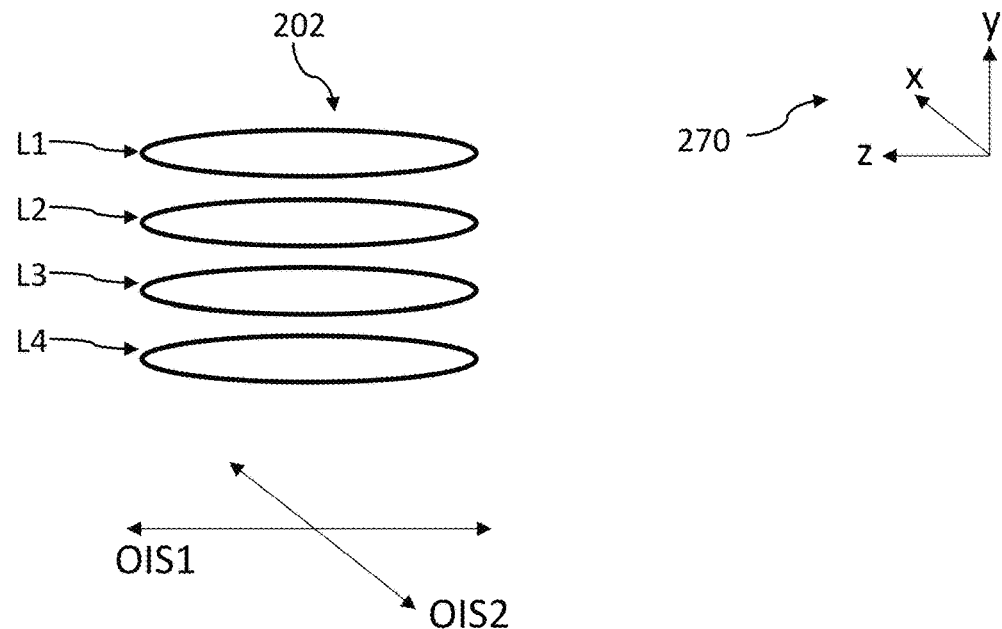
FIG. 2K shows yet another embodiment of an AF and OIS mechanism for the folded cameras of FIG. 2D.
Figure 2K:
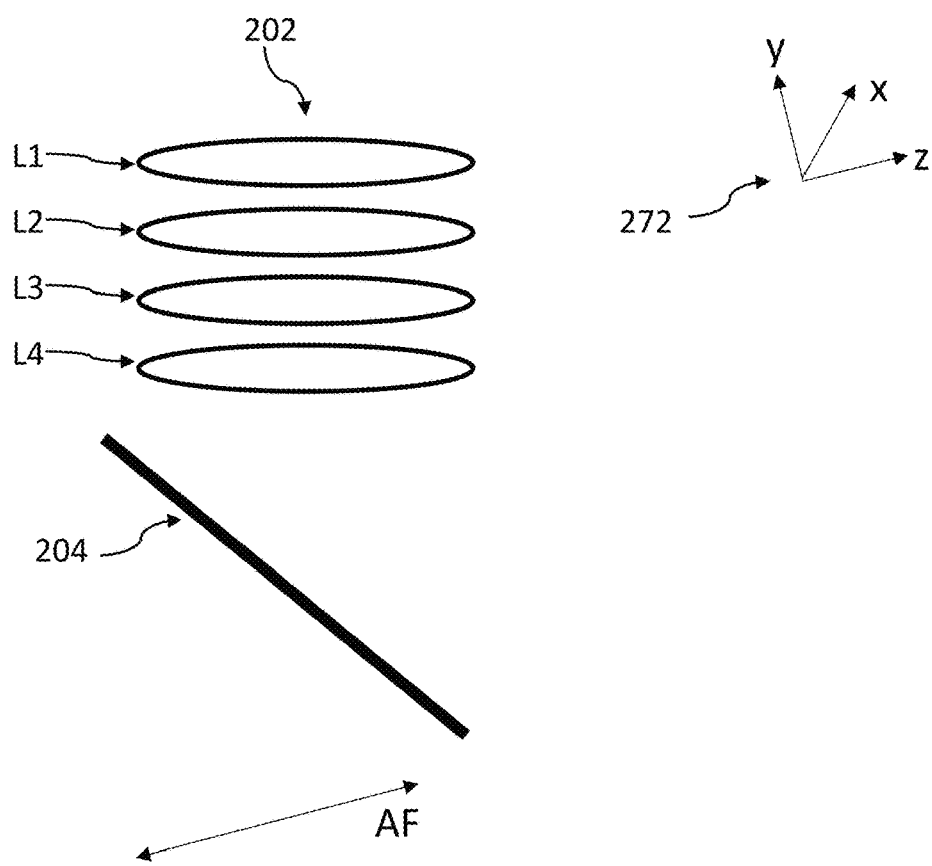

FIG. 2K shows an embodiment of a third AF and OIS mechanism disclosed herein for camera 240. Lens 202 and OPFE 204 are shown in a same orientation as in FIGS. 2A-F.

For OIS around a first OIS direction and around a second OIS direction, the movement is performed with respect to coordinate system 270 which has the same orientation as the coordinate systems shown in FIGS. 2A-F. For AF, the movement is performed with respect to coordinate system 272 which the same orientation as the coordinate system shown in FIG. 2J. For OIS, lens 202 is moved relative to the OPFE and to the image sensor (not shown) along a first OIS axis ("OIS1") parallel to the z-axis (of coordinate system 270) for OIS along a first axis, and along a second OIS axis ("OIS2") parallel to the x-axis (of coordinate system 270) for OIS along a second axis. For AF, lens 202 and OPFE 204 are moved as one unit relative to the image sensor (not shown) along an axis parallel to the z-axis of coordinate system 272. It is noted that only a slight movement along the y-axis of coordinate system 270 is associated to performing AF and OIS according to the third AF and OIS mechanism.

The differences between the embodiment of a third AF and OIS mechanism for camera 200 (see FIG. 2I) and the embodiment of a third AF and OIS mechanism for camera 240 (see FIG. 2K) are based on the same considerations as explained in FIG. 2J.

FIGS. 3A-3D illustrate optical lens systems disclosed herein. All lens systems shown in FIG. 3A-3D can be included in a folded camera such as shown in FIGS. 2A-C and FIGS. 2G-H.

Table 1 summarizes values and ratios thereof of various features that are included in the lens systems shown in FIGS. 3A-3D ($WL_M$, $WL_O$, LT, $W_{OPFE-ON}$, $W_{OPFE-OFF}$, HS, SD, ΔLO, R1, R2, $TTL_1$, $BFL_1$, $TTL_2$, TTL, BFL, EFL, DA, ALT, AGT, $d_{23}$, $f_1$, $T_1$, $ET_1$, $ET_j$, MML, ML, $MMH1_{ON}$, $MMH1_{OFF}$, $MH_{ON}$, $MH_{OFF}$, MMH2, SH, $B_{min-ON}$, $B_{min-OFF}$ given in mm, HFOV given in degrees). Definitions and units as given here are valid also for Table 12.

DA is the aperture diameter. For the cut lens 332 of embodiment 330, an effective DA as known in the art is given.

The average lens thickness ("ALT") measures the average thickness of all lens elements which are located on an object side of the mirror. E.g., for embodiments 310, 320 and 330, ALT gives the average thickness of all lens elements. For embodiment 300, ALT gives the average thickness of $L_1$-$L_{N-1}$ ($L_N$ excluded).

The average gap thickness ("AGT") measures the average thickness of all gaps between lens elements which are located on an object side of the mirror.

$d_{23}$ is the distance between $L_2$ and $L_3$.

$T_1$ is the center thickness of $L_1$.

$ET_1$ is the thickness of $L_1$ at its edge.

$ET_j$ is the thickness of $L_j$ at its edge, wherein $L_j$ is the lens element that has the largest edge thickness of lens elements that are located on an object side of the mirror.

TABLE 1

|  | 300 | 310 | 320 | 330 | MIN value | MAX value |
| --- | --- | --- | --- | --- | --- | --- |
| $WL_M$ | 8.12 | 8.42 | 8.26 | 6.40 | 6.40 | 8.42 |
| $WL_O$ | 8.02 | 8.32 | 8.16 | 6.40 | 6.40 | 8.32 |
| LT | 1.66 | 3.05 | 1.50 | 1.50 | 1.50 | 3.05 |
| $W_{OPFE-ON}$ | 7.11 | 7.30 | 7.17 | 5.74 | 5.74 | 7.30 |
| $W_{OPFE-OFF}$ | 7.46 | 7.65 | 7.57 | 6.04 | 6.04 | 7.65 |
| HS | 3.36 | 3.36 | 3.36 | 3.36 | 3.36 | 3.36 |
| SD | 5.6 | 5.6 | 5.6 | 5.6 | 5.6 | 5.6 |
| ΔLO | 0.001 | 0.03 | 0.07 | 0.07 | 0.00 | 0.07 |
| R1 | 8.12 | 8.42 | 8.26 | 6.40 | 6.40 | 8.42 |
| R2 | 23.72 | 29.70 | 22.21 | 24.08 | 22.21 | 29.70 |
| $TTL_1$ | 5.63 | 7.08 | 5.57 | 4.70 | 4.70 | 7.08 |
| $BFL_1$ | 0 | 4.03 | 4.07 | 3.20 | 3.20 | 4.07 |
| $TTL_2$ | 27.78 | 33.90 | 26.33 | 27.34 | 26.33 | 33.90 |
| TTL | 33.40 | 40.98 | 31.90 | 32.05 | 31.90 | 40.98 |
| BFL | 0.00 | 37.94 | 30.40 | 30.54 | 0.00 | 37.94 |
| EFL | 29.77 | 40.00 | 31.20 | 31.29 | 29.77 | 40.00 |
| DA | 8.02 | 8.00 | 8.06 | 7.57 | 7.57 | 8.06 |
| ALT | 0.53 | 0.41 | 0.44 | 0.44 | 0.41 | 0.53 |
| AGT | 0.03 | 0.25 | 0.08 | 0.08 | 0.03 | 0.25 |
| $d_{23}$ | 0.03 | 0.03 | 0.13 | 0.13 | 0.03 | 0.13 |
| $f_1$ | 17.17 | 20.77 | 15.00 | 15.00 | 15.00 | 20.77 |
| $T_1$ | 1.07 | 0.69 | 0.84 | 0.84 | 0.69 | 1.07 |
| $ET_1$ | 0.30 | 0.30 | 0.30 | 0.50 | 0.30 | 0.50 |
| $ET_j$ | 0.42 | 0.40 | 0.54 | 0.50 | 0.40 | 0.54 |
| $L_j$ | 2 | 3 | 2 | 1 |  |  |
| f number | 3.71 | 5.00 | 3.87 | 4.13 | 3.71 | 5.00 |
| HFOV | 4.84 | 4.01 | 5.17 | 5.11 | 4.01 | 5.17 |
| MML | 31.84 | 38.11 | 30.47 | 30.48 | 30.47 | 38.11 |
| ML | 35.34 | 41.61 | 33.97 | 33.98 | 33.97 | 41.61 |
| $MMH1_{ON}$ | 8.68 | 10.17 | 8.60 | 7.24 | 7.24 | 10.17 |
| $MMH1_{OFF}$ | 9.04 | 10.52 | 9.01 | 7.54 | 7.54 | 10.52 |
| $MH_{ON}$ | 10.18 | 11.67 | 10.10 | 8.74 | 8.74 | 11.67 |
| $MH_{OFF}$ | 10.54 | 12.02 | 10.51 | 9.04 | 9.04 | 12.02 |
| MMH2 | 3.36 | 3.36 | 3.36 | 3.36 | 3.36 | 3.36 |
| SH | 4.86 | 4.86 | 4.86 | 4.86 | 4.86 | 4.86 |
| SH/$MH_{ON}$ | 0.48 | 0.42 | 0.48 | 0.56 | 0.42 | 0.56 |
| $B_{min-ON}$ | 1.68 | 3.17 | 1.60 | 0.24 | 0.24 | 3.17 |
| $B_{min-OFF}$ | 2.04 | 3.52 | 2.01 | 0.54 | 0.54 | 3.52 |
| $T_1$/ALT | 2.02 | 1.70 | 1.88 | 1.88 | 1.70 | 2.02 |
| ΔLO/TTL | 0.00003 | 0.00076 | 0.00227 | 0.00226 | 0.00003 | 0.00227 |
| ALT/TTL | 0.016 | 0.010 | 0.014 | 0.014 | 0.010 | 0.016 |
| AGT/TTL | 0.001 | 0.006 | 0.003 | 0.003 | 0.001 | 0.006 |
| $f_1$/EFL | 0.577 | 0.519 | 0.481 | 0.480 | 0.480 | 0.577 |
| $d_{23}$/LT | 0.021 | 0.011 | 0.088 | 0.088 | 0.011 | 0.088 |

TABLE 1-continued

|  | 300 | 310 | 320 | 330 | MIN value | MAX value |
|---|---|---|---|---|---|---|
| TTL/EFL | 1.12 | 1.02 | 1.02 | 1.02 | 1.02 | 1.12 |
| BFL/EFL | 0.00 | 0.95 | 0.97 | 0.98 | 0.00 | 0.98 |
| BFL/TTL | 0.00 | 0.93 | 0.95 | 0.95 | 0.00 | 0.95 |

FIG. 3A shows schematically an embodiment of an optical lens system disclosed herein and numbered 300. Lens system 300 comprises a lens 302, a mirror 304, an optical element 306 and an image sensor 308. System 300 is shown with ray tracing. Optical element 306 is optional and may be for example an infra-red (IR) filter, and/or a glass image sensor dust cover.

Lens 302 is divided in two lens groups, 302-1 that includes $L_1$-$L_3$ ("G1"), and 302-2 that includes $L_4$ ("G2"). Mirror 304 is oriented at an angle of 45 degrees with respect to the y-axis and the z-axis. Optical rays pass through 302-1, are reflected by mirror 304, pass through 302-2 and form an image on image sensor 308. FIG. 3A shows 5 fields with 5 rays for each.

Lens 302 includes a plurality of N lens elements $L_i$ (wherein "i" is an integer between 1 and N). $L_1$ is the lens element closest to the object side and $L_N$ is the lens element closest to the image side, i.e. the side where the image sensor is located. This order holds for all lenses and lens elements disclosed herein. The N lens elements are axial-symmetric along an optical (lens) axis 311. Each lens element $L_i$ comprises a respective front surface $S_{2i-1}$ (the index "2i-1" being the number of the front surface) and a respective rear surface $S_{2i}$ (the index "2i" being the number of the rear surface), where "i" is an integer between 1 and N. This numbering convention is used throughout the description. Alternatively, as done throughout this description, lens surfaces are marked as "$S_k$", with k running from 1 to 2N. The front surface and the rear surface can be in some cases aspherical. This is however not limiting. As used herein the term "front surface" of each lens element refers to the surface of a lens element located closer to the entrance of the camera (camera object side) and the term "rear surface" refers to the surface of a lens element located closer to the image sensor (camera image side).

Detailed optical data and surface data are given in Tables 2-3 for the example of the lens elements in FIG. 3A. The values provided for these examples are purely illustrative and according to other examples, other values can be used.

Surface types are defined in Table 2. The coefficients for the surfaces are defined in Table 3. The surface types are:

TABLE 2 a) Plano: flat surfaces, no curvature
b) Q type 1 (QT1) surface sag formula:

$$z(r) = \frac{cr^2}{1 + \sqrt{1 - (1+k)c^2 r^2}} + D_{con}(u) \qquad \text{(Eq. 1)}$$

$$D_{con}(u) = u^4 \sum_{n=0}^{N} A_n Q_n^{con}(u^2)$$

$$u = \frac{r}{r_{norm}}, \; x = u^2$$

$$Q_0^{con}(x) = 1 \quad Q_1^{con} = -(5 - 6x) \quad Q_2^{con} = 15 - 14x(3 - 2x)$$

$$Q_3^{con} = -\{35 - 12x[14 - x(21 - 10x)]\}$$

$$Q_4^{con} = 70 - 3x\{168 - 5x[84 - 11x(8 - 3x)]\}$$

$$Q_5^{con} = -[126 - x(1260 - 11x\{420 - x[720 - 13x(45 - 14x)]\})]$$

where {z, r} are the standard cylindrical polar coordinates, c is the paraxial curvature of the surface, k is the conic parameter, $r_{norm}$ is generally one half of the surface's clear aperture, and $A_n$ are the polynomial coefficients shown in lens data tables. The Z axis is positive towards image. Values for CA are given as a clear aperture radius, i.e. CA/2. The reference wavelength is 555.0 nm. Units are in mm except for refraction index ("Index") and Abbe #. Each lens element $L_i$ has a respective focal length $f_i$, given in Table 1. The FOV is given as half FOV (HFOV). The definitions for surface types, Z axis, CA values, reference wavelength, units, focal length and HFOV are valid for Tables 2-11.

TABLE 3

Embodiment 300
EFL = 29.75 mm, F number = 3.71, HFOV = 4.84 deg.

| Surface # | Comment | Type | Curvature Radius | Thickness | Aperture Radius (D/2) | Material | Index | Abbe # | Focal Length |
|---|---|---|---|---|---|---|---|---|---|
| 1 | Stop |  | Infinity | −0.299 | 4.011 |  |  |  |  |
| 2 | Lens 1 | ASP | 21.624 | 1.073 | 4.011 | Glass | 1.49 | 84.47 | 17.17 |
| 3 |  |  | −13.435 | 0.034 | 3.994 |  |  |  |  |

TABLE 3-continued

Embodiment 300
EFL = 29.75 mm, F number = 3.71, HFOV = 4.84 deg.

| 4 | Lens 2 | ASP | −16.321 | 0.267 | 3.987 | Plastic | 1.61 | 25.59 | 236.76 |
|---|---|---|---|---|---|---|---|---|---|
| 5 | | | −14.776 | 0.034 | 3.980 | | | | |
| 6 | Lens 3 | ASP | −15.436 | 0.250 | 3.983 | Plastic | 1.57 | 37.40 | −31.45 |
| 7 | | | −111.867 | 3.969 | 3.974 | | | | |
| 8 | Mirror | Plano | Infinity | 26.205 | 5.612 | | | | |
| 9 | Filter | Plano | Infinity | 0.210 | — | Glass | 1.52 | 64.17 | |
| 10 | | | Infinity | 0.600 | — | | | | |
| 11 | Lens 4 | ASP | 3.328 | 0.762 | 2.852 | Plastic | 1.53 | 55.69 | 6.20 |
| 12 | | | Infinity | 0.000 | 3.005 | | | | |
| 13 | Image | Plano | Infinity | — | — | | | | |

Aspheric Coefficients

| Surface # | Conic | A4 | A6 | A8 | A10 | A12 |
|---|---|---|---|---|---|---|
| 2 | 0 | −1.11E−04 | −3.36E−06 | −4.12E−07 | 3.74E−08 | 0.00E+00 |
| 3 | 0 | 7.76E−04 | −1.09E−05 | 4.19E−07 | 1.56E−08 | 0.00E+00 |
| 4 | 0 | 7.78E−05 | 4.35E−05 | −1.30E−06 | 1.59E−08 | 0.00E+00 |
| 5 | 0 | 8.16E−04 | 3.98E−05 | −6.98E−07 | 3.15E−09 | 0.00E+00 |
| 6 | 0 | 1.22E−03 | 1.36E−05 | 1.70E−07 | −9.32E−09 | 0.00E+00 |
| 7 | 0 | −3.17E−04 | 2.34E−05 | −1.20E−06 | 2.55E−08 | 0.00E+00 |
| 11 | 0 | −7.53E−02 | −5.69E−03 | 4.71E−03 | −6.00E−04 | 2.33E−05 |
| 12 | 0 | 0.00E+00 | 0.00E+00 | 0.00E+00 | 0.00E+00 | 0.00E+00 |

In movement schemes for AF and OIS, lens group 302-2 is considered being a part of image sensor 308, in a sense that it does not perform any lens movements. Explicitly, this is explained in the following three paragraphs.

For focusing and OIS of optical lens system 300 according to the first AF and OIS method (see FIG. 2G), all lens elements of lens group 302-1 are moved together. The lens element of lens group 302-2 does not move.

For focusing and OIS optical system 300 according to the second AF and OIS method (see FIG. 2H), all lens elements of lens group 302-1 and mirror 304 are moved together. The lens element of lens group 302-2 does not move.

For focusing and OIS optical system 300 according to the third AF and OIS method (see FIG. 2I), for OIS all lens elements of lens group 302-1 are moved together. The lens element of lens group 302-2 does not move. For AF, all lens elements of lens group 302-1 and mirror 304 are moved together. The lens element of lens group 302-2 does not move.

The distance between G1 and G2 is d(G1-G2), measured according to d(G1-G2)=d(G1-G2)$_1$+d(G1-G2)$_2$. In 300, d(G1-G2)1=3.97 mm, d(G1-G2)$_2$=27.02 mm, d(G1-G2)=30.99 mm and d(G1-G2)/TTL=0.93.

The last lens element $L_4$ is located at an image side of optical element 306 and at an object side of image sensor 308. In other embodiments (not shown), $L_4$ may be located at an object side of both optical element 306 and image sensor 308.

The last lens element $L_4$ is located right next to image sensor 308, i.e. a distance (or thickness) of from $L_4$ to image sensor 308 is zero (Thickness 12 in Table 2). In other embodiments (not shown), $L_4$ may be located farther away from image sensor 308, e.g. $L_4$ may be located at a distance of 0.05 mm to 5 mm from image sensor 308. A power sequence of lens elements $L_1$-$L_4$ is plus-plus-minus-plus.

$L_1$, $L_2$ as well as $L_2$, $L_3$ are very close to each other. Here and in the following, a pair of consecutive lens elements $L_i$, $L_{i+1}$ is "very close to each other", if a closest gap (or distance) "Gap$_i$" between $L_i$ and $L_{i+1}$ and measured along the y-axis is Gap$_i$<0.1 mm at some position between optical axis 311 and the diameter radius of $L_i$ or $L_{i+1}$. Specifically, Gap$_1$=0.03 mm (between $L_1$ and $L_2$), Gap$_2$=0.03 mm (between $L_2$ and $L_3$).

FIG. 3B shows schematically another embodiment of an optical lens system disclosed herein and numbered 310. Lens system 310 comprises a lens 312, a mirror 314, an optical element 306 and an image sensor 308. Lens 312 includes 5 lens elements numbered $L_1$-$L_5$.

Surface types are defined in Table 4. The coefficients for the surfaces are defined in

TABLE 5

A power sequence of lens elements $L_1$-$L_5$ is plus-minus-minus-plus-minus.
Table 4
Table 5
Embodiment 310
EFL = 40.0 mm, F number = 5.00, HFOV = 4.00 deg.

| Surface # | Comment | Type | Curvature Radius | Thickness | Aperture Radius (D/2) | Material | Index | Abbe # | Focal Length |
|---|---|---|---|---|---|---|---|---|---|
| 1 | Stop | | Infinity | 0.091 | 4.000 | | | | |
| 2 | Lens 1 | QT1 | 11.691 | 0.695 | 4.000 | Plastic | 1.53 | 56.16 | 20.77 |
| 3 | | | −219.476 | 0.035 | 4.057 | | | | |
| 4 | Lens 2 | QT1 | 11.271 | 0.250 | 4.159 | Plastic | 1.53 | 55.97 | −31.96 |
| 5 | | | 6.740 | 0.033 | 4.156 | | | | |

TABLE 5-continued

A power sequence of lens elements $L_1$-$L_5$ is plus-minus-minus-plus-minus.
Table 4
Table 5
Embodiment 310
EFL = 40.0 mm, F number = 5.00, HFOV = 4.00 deg.

| | | | | | | | | | |
|---|---|---|---|---|---|---|---|---|---|
| 6 | Lens 3 | QT1 | 4.924 | 0.249 | 4.127 | Plastic | 1.66 | 20.34 | −253.16 |
| 7 | | | 4.688 | 0.909 | 4.065 | | | | |
| 8 | Lens 4 | QT1 | −8.469 | 0.582 | 4.053 | Plastic | 1.54 | 56.23 | 50.47 |
| 9 | | | −6.615 | 0.022 | 4.011 | | | | |
| 10 | Lens 5 | QT1 | −9.282 | 0.272 | 3.987 | Plastic | 1.66 | 20.27 | −121.08 |
| 11 | | | −10.612 | 4.031 | 3.895 | | | | |
| 12 | Mirror | Plano | Infinity | 32.694 | 5.657 | | | | |
| 13 | Filter | Plano | Infinity | 0.210 | — | Glass | 1.52 | 64.17 | |
| 14 | | | Infinity | 1.000 | — | | | | |
| 15 | Image | Plano | Infinity | — | — | | | | |

Aspheric Coefficients

| Surface # | Rnorm | A0 | A1 | A2 | A3 |
|---|---|---|---|---|---|
| 2 | 4.05E+00 | −4.09E−01 | −3.08E−01 | 6.27E−02 | 1.26E−02 |
| 3 | 4.10E+00 | −1.65E−01 | −1.26E−01 | −7.35E−03 | 2.11E−02 |
| 4 | 4.14E+00 | −3.20E−01 | 1.59E−01 | −8.01E−02 | −3.14E−03 |
| 5 | 4.09E+00 | −6.35E−01 | −1.84E−01 | 4.34E−02 | −1.42E−02 |
| 6 | 4.08E+00 | −1.40E+00 | −2.10E−02 | 3.02E−02 | −1.51E−02 |
| 7 | 3.99E+00 | −1.22E+00 | −9.43E−02 | 2.60E−02 | −7.69E−03 |
| 8 | 3.97E+00 | 1.20E+00 | −1.40E−01 | 3.31E−02 | −6.53E−03 |
| 9 | 3.92E+00 | 1.04E+00 | 2.95E−01 | −1.66E−02 | 7.92E−04 |
| 10 | 3.91E+00 | 5.58E−01 | 1.48E−01 | −3.45E−02 | 2.08E−02 |
| 11 | 3.84E+00 | 3.75E−01 | 1.96E−01 | −3.03E−03 | 7.99E−03 |

Aspheric Coefficients

| Surface # | A4 | A5 | A6 |
|---|---|---|---|
| 2 | 8.85E−03 | −7.68E−03 | 1.48E−03 |
| 3 | 1.38E−02 | −6.00E−03 | −6.14E−04 |
| 4 | 1.15E−02 | 3.66E−03 | −1.53E−03 |
| 5 | −8.23E−03 | 1.72E−02 | −3.99E−03 |
| 6 | −1.95E−03 | 7.75E−03 | −2.41E−03 |
| 7 | 6.68E−02 | −1.23E−02 | 4.80E−03 |
| 8 | −2.03E−02 | −1.85E−03 | 6.69E−03 |
| 9 | −8.49E−03 | −1.46E−02 | 9.42E−03 |
| 10 | 1.24E−02 | −3.21E−02 | 1.09E−02 |
| 11 | 5.44E−03 | −1.50E−02 | 4.10E−03 |

All lens elements of lens 312 are very close to each other. Specifically, $Gap_1$=0.03 mm (between $L_1$ and $L_2$), $Gap_2$=0.03 mm (between $L_2$ and $L_3$), $Gap_3$=0.03 mm (between $L_3$ and $L_4$) and $Gap_4$=0.02 mm (between $L_4$ and $L_5$).

FIG. 3C shows schematically yet another embodiment of an optical lens system disclosed herein and numbered 320. Lens system 320 comprises a lens 322, a mirror 324, an optical element 306 and an image sensor 308. Lens 322 includes 3 lens elements numbered $L_1$-$L_3$. A power sequence of lens elements $L_1$-$L_3$ is plus-minus-minus.

All lens elements of lens 322 are very close to each other. Specifically, $Gap_1$=0.03 mm and $Gap_2$=0.03 mm. Surface types are defined in Table 6. The coefficients for the surfaces are defined in Table 7.

TABLE 6

Embodiment 320
EFL = 31.36 mm, F number = 3.87, HFOV = 5.19 deg.

| Surface # | Comment | Type | Curvature Radius | Thickness | Aperture Radius (D/2) | Material | Index | Abbe # | Focal Length |
|---|---|---|---|---|---|---|---|---|---|
| 1 | Stop | | Infinity | −0.037 | 4.031 | | | | |
| 2 | Lens 1 | ASP | −621.845 | 0.836 | 4.042 | Glass | 1.88 | 41.01 | 15.00 |
| 3 | | | −13.002 | 0.035 | 4.042 | | | | |
| 4 | Lens 2 | ASP | 47.384 | 0.249 | 4.030 | Plastic | 1.67 | 19.24 | −59.61 |
| 5 | | | 21.749 | 0.131 | 4.082 | | | | |
| 6 | Lens 3 | ASP | −224.502 | 0.250 | 4.069 | Plastic | 1.57 | 37.40 | −53.06 |
| 7 | | | 34.960 | 4.073 | | | | | |
| 8 | Mirror | Plano | Infinity | 25.116 | 4.052 | | | | |

TABLE 6-continued

Embodiment 320
EFL = 31.36 mm, F number = 3.87, HFOV = 5.19 deg.

| Surface # | Comment | Type | Curvature Radius | Thickness | Aperture Radius (D/2) | Material | Index | Abbe # | Focal Length |
|---|---|---|---|---|---|---|---|---|---|
| 9 | Filter | Plano | Infinity | 0.21 | — | Glass | 1.52 | 64.17 | |
| 10 | | | Infinity | 1.000 | — | | | | |
| 11 | Image | Plano | Infinity | — | — | | | | |

TABLE 7

Aspheric Coefficients

| Surface # | Conic | A4 | A6 |
|---|---|---|---|
| 2 | 0 | −7.51E−05 | 2.08E−05 |
| 3 | 0 | 7.31E−04 | −4.05E−06 |
| 4 | 0 | −2.63E−03 | 2.43E−05 |
| 5 | 0 | −1.91E−03 | 2.41E−06 |
| 6 | 0 | −5.43E−04 | 4.02E−05 |
| 7 | 0 | −2.74E−03 | 1.13E−04 |

FIG. 3D shows schematically yet another embodiment of an optical lens system disclosed herein and numbered 330. Lens system 330 comprises a lens 332, a mirror 334, an optical element 306 and an image sensor 308. Lens 332 includes 3 lens elements numbered $L_1$-$L_3$. A power sequence of lens elements $L_1$-$L_3$ is plus-minus-minus. Lens 332 is obtained by cutting the width of the lens elements of lens 322 by 20%. For details on lens elements included in lens 332, it is referred to Table 6 and Table 7. The cutting is performed along a direction parallel to the lens optical axis (i.e. parallel to the y-axis), so that a width of lens WL measured along a z-direction ("$WL_Z$") is smaller than in a WL measured along a x-direction ("$WL_X$"), i.e. $WL_Z < WL_X$ (see FIG. 7).

As can be seen in Table 1, the cutting of lens 332 translates to significant savings in terms of module height (MH), which is beneficial for slim mobile device design: $MMH_{ON}$ and $MMH1_{OFF}$ are reduced from 8.6 mm to 7.24 mm and from 9.01 mm to 7.54 mm respectively. $MH_{ON}$ is reduced from 10.1 mm to 8.74 mm (about 16% reduction). The cutting of lens 332 by 20% translates into camera module height savings of about 15-20%.

In lens system 330, there are no significant savings in terms of module length (ML). As of Field curvature, the lens optimization on the smaller vertical (i.e. along a y-axis) image region shifts the optimal focus distance to higher z-values, diminishing the reduction of the cutting in z-direction. All lens elements of lens 332 are very close to each other. Specifically, $Gap_1=0.03$ mm and $Gap_2=0.03$ mm.

FIG. 3E shows schematically an embodiment of an optical lens system disclosed herein and numbered 340. Lens system 340 can be included in a folded camera with sloped OP such as shown in FIGS. 2D-F. Lens system 340 comprises a lens 342, a mirror 344, an optical element 306 (optional) and an image sensor 308. Lens 342 includes 4 lens elements numbered $L_1$-$L_4$.

Surface types are defined in Table 8. The coefficients for the surfaces are defined in Table 9. The semi-diameter (D/2) of mirror 344 is defined by a circle that fully incorporates it. A length of mirror 344 measured in the yz-mirror-plane is 4.2 mm, its width (measured along the x-axis, not shown here) is 6 mm. The tilting angle β of mirror 344 with respect to the z-axis is 51 degrees. OP 313 is not parallel to the z-axis, but forms an angle α with the z-axis.

Both $L_3$ and $L_4$ have a lens surface that has two or more deflection points. A power sequence of lens elements $L_1$-$L_4$ is plus-minus-plus-minus.

All lens elements of lens 340 are very close to each other. Specifically, $Gap_1=0.03$ mm (between $L_1$ and $L_2$), $Gap_2=0.03$ mm (between $L_2$ and $L_3$) and $Gap_3=0.04$ mm (between $L_3$ and $L_4$). For all three $Gap_i$'s, $Gap_i/LT<0.015$ is fulfilled.

In other embodiments, lens 342 may be a cut to achieve a cut lens based on lens 342. The cut lens may be obtained by cutting the width of lens elements of lens 342 by 10%-40%. The cutting is of the width is performed along a direction parallel to the lens optical axis (i.e. parallel to the y-axis), so that a width of lens WL measured along a y-direction ("$WL_Y$") is smaller than in a WL measured along a x-direction ("$WL_X$"), i.e. $WL_Y < WL_X$ (see FIG. 7). The cutting of lens 342 translates to significant savings in terms of MH, which is beneficial for slim mobile device design: By cutting lens 342 by 20%, MH and MMH are reduced from 10.3 mm to 9.23 mm (about 11% MH reduction) and from 8.8 mm to 7.73 mm (about 14% MMH reduction) respectively. MML is reduced from 13.28 mm to 12.68 mm. By the cutting, the lens aperture is reduced from 6 mm to 5.68 mm, so that the f number increases from 2.78 to 2.94.

TABLE 8

Embodiment 340
EFL = 16.69 mm, F number = 2.78, HFOV = 15.77 deg.

| Surface # | Comment | Type | Curvature Radius | Thickness | Aperture Radius (D/2) | Material | Index | Abbe # | Focal Length |
|---|---|---|---|---|---|---|---|---|---|
| 1 | A.S. | Plano | Infinity | −1.351 | 3.000 | | | | |
| 2 | Lens 1 | ASP | 3.903 | 1.848 | 3.000 | Plastic | 1.53 | 55.7 | 6.468 |
| 3 | | | −26.150 | 0.479 | 2.926 | | | | |
| 4 | Lens 2 | ASP | −3.510 | 0.336 | 2.866 | Plastic | 1.61 | 25.6 | −2.515 |
| 5 | | | 2.897 | 0.245 | 2.621 | | | | |
| 6 | Lens 3 | ASP | 4.232 | 0.492 | 2.578 | Plastic | 1.61 | 25.6 | 3.922 |

TABLE 8-continued

Embodiment 340
EFL = 16.69 mm, F number = 2.78, HFOV = 15.77 deg.

| Surface # | Comment | Type | Curvature Radius | Thickness | Aperture Radius (D/2) | Material | Index | Abbe # | Focal Length |
|---|---|---|---|---|---|---|---|---|---|
| 7 | | | −5.432 | 0.035 | 2.414 | | | | |
| 8 | Lens 4 | ASP | 7.617 | 0.571 | 2.465 | Plastic | 1.67 | 19.2 | −105.997 |
| 9 | | | 6.678 | 2.694 | 2.558 | | | | |
| 10 | Mirror | Plano | Infinity | 9.261 | 3.662 | | | | |
| 11 | Filter | Plano | Infinity | 0.210 | — | Glass | 1.52 | 64.2 | |
| 12 | | | Infinity | 0.210 | — | | | | |
| 13 | Image | Plano | Infinity | — | 4.8 | | | | |

TABLE 9

Aspheric Coefficients

| Surface # | Conic | $4^{th}$ | $6^{th}$ | $8^{th}$ | $10^{th}$ | $12^{th}$ | $14^{th}$ | $16^{th}$ |
|---|---|---|---|---|---|---|---|---|
| 2 | 0 | 1.890E−004 | 3.331E−004 | −2.242E−004 | 7.390E−005 | −1.299E−005 | 1.197E−006 | −4.674E−008 |
| 3 | 0 | 1.239E−002 | −4.636E−003 | 1.372E−003 | −1.948E−004 | 1.153E−005 | −6.287E−008 | −1.686E−008 |
| 4 | 0 | 2.154E−002 | 5.172E−004 | −4.417E−004 | 9.190E−005 | −1.478E−005 | 1.543E−006 | −6.575E−008 |
| 5 | 0 | −5.857E−002 | 1.711E−002 | −4.757E−003 | 1.007E−003 | −1.528E−004 | 1.314E−005 | −4.750E−007 |
| 6 | 0 | −4.119E−002 | −1.782E−003 | 2.136E−003 | 2.077E−004 | −1.509E−004 | 1.789E−005 | −6.474E−007 |
| 7 | 0 | 3.351E−002 | −5.525E−003 | −8.702E−003 | 9.544E−004 | −1.711E−004 | 8.570E−006 | 1.170E−007 |
| 8 | 0 | 1.348E−002 | 7.927E−003 | −7.209E−003 | 2.364E−003 | −4.289E−004 | 4.281E−005 | −1.877E−006 |
| 9 | 0 | −1.277E−002 | 8.078E−003 | −2.879E−003 | 5.050E−004 | −4.477E−005 | 1.308E−006 | 7.772E−009 |

Figure 3F:
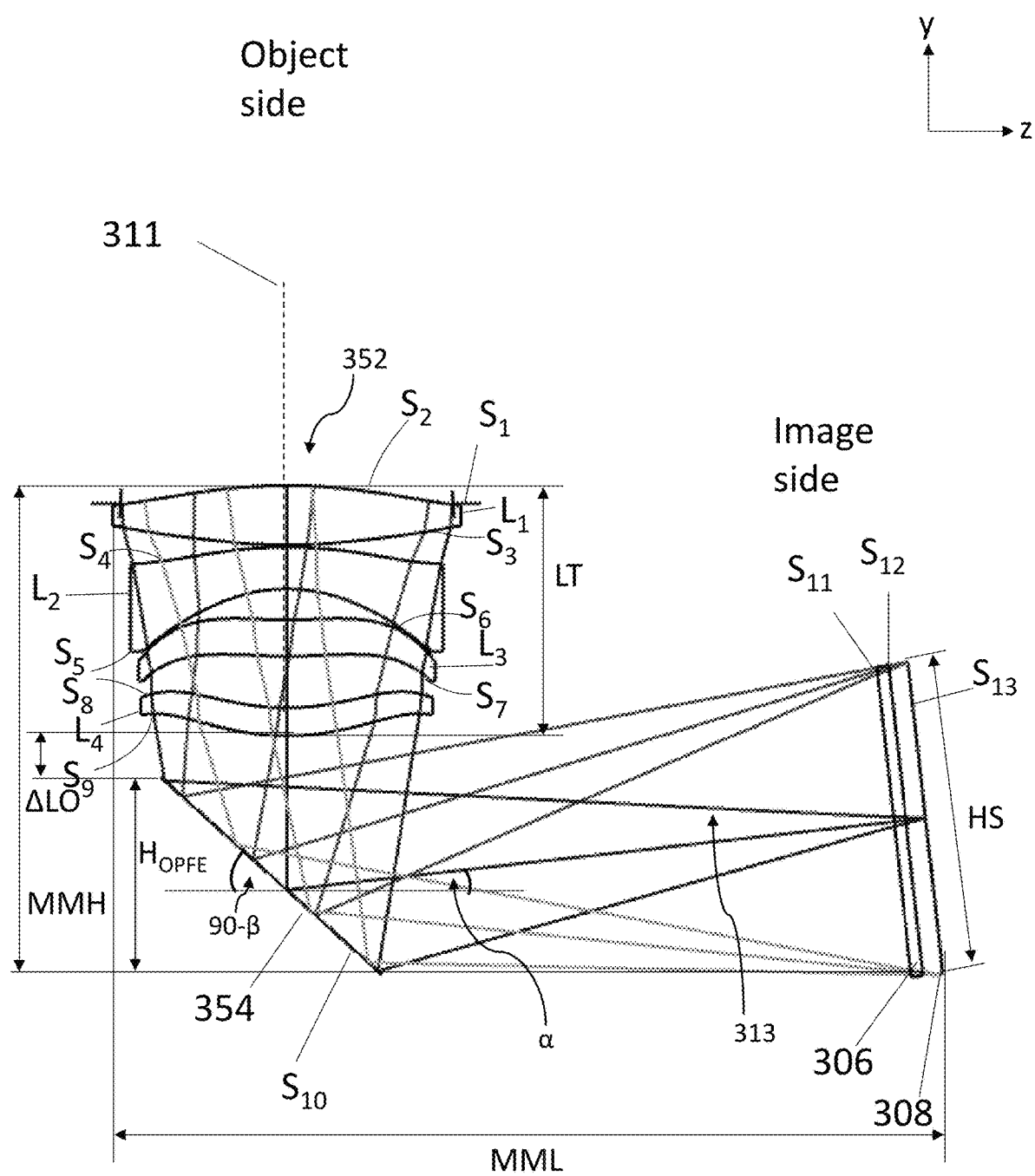
FIG. 3F shows schematically yet another embodiment of an optical lens system disclosed herein.

FIG. 3F shows schematically another embodiment of an optical lens system disclosed herein and numbered 350. Lens system 350 can be included in a folded camera with sloped OP such as shown in FIGS. 2D-F. Lens system 350 comprises a lens 352, a mirror 354, an optical element 306 (optional) and an image sensor 308. Lens 352 includes 4 lens elements numbered $L_1$-$L_4$.

Surface types are defined in Table 10. The coefficients for the surfaces are defined in Table 11. The semi-diameter (D/2) of mirror 354 is defined by a circle that fully incorporates it. A length of mirror 354 measured in the yz-mirror-plane is 5.2 mm, its width (measured along the x-axis, not shown here) is 5.6 mm. The tilting angle R of mirror 354 with respect to the z-axis is 48.2 degrees. OP 313 is not parallel to the z-axis, but forms an angle α with the z-axis. Both $L_3$ and $L_4$ have a lens surface that has two or more deflection points.

Lens element pairs $L_1$, $L_2$ and $L_2$, $L_3$ of lens 350 are very close to each other. Specifically, $Gap_1$=0.04 mm and $Gap_2$=0.04 mm. For $Gap_1$ and $Gap_2$, $Gap_1$/LT<0.015 and $Gap_2$/LT<0.015 is fulfilled. In both lens systems 340 and 350, at least one of the $GAP_i$s is located not at a center of the lens elements. A power sequence of lens elements $L_1$-$L_4$ is plus-minus-plus-plus.

In other embodiments, lens 352 may be cut to achieve a cut lens based on lens 352. The cut lens may be obtained by cutting the width of lens elements of lens 352 by 10%-40%. The cutting is of the width is performed along a direction parallel to the y-axis, so that a width of lens WL measured along a y-direction ("$WL_Y$") is smaller than in a WL measured along a x-direction ("$WL_X$"), i.e. $WL_Y$<$WL_X$ (see FIG. 7). For example, by cutting lens 352 by 20%, MH may be reduced by about 7.5%-20% and MMH may be reduced by about 10%-20%.

TABLE 10

Embodiment 350
EFL = 18.00 mm, F number = 3.1, HFOV = 14.2 deg.

| Surface # | Comment | Type | Curvature Radius | Thickness | Aperture Radius (D/2) | Material | Index | Abbe # | Focal Length |
|---|---|---|---|---|---|---|---|---|---|
| 1 | A.S. | Plano | Infinity | −0.281 | 2.900 | | | | |
| 2 | Lens 1 | QT1 | 9.028 | 1.045 | 3.029 | Glass | 1.74 | 44.5 | 5.944 |
| 3 | | | −8.194 | 0.036 | 2.947 | | | | |
| 4 | Lens 2 | QT1 | 8.120 | 0.731 | 2.718 | Plastic | 1.61 | 25.6 | −7.570 |
| 5 | | | 2.868 | 0.545 | 2.532 | | | | |
| 6 | Lens 3 | QT1 | −7.133 | 0.639 | 2.585 | Plastic | 1.53 | 55.7 | 5596.379 |
| 7 | | | −7.339 | 0.908 | 2.499 | | | | |
| 8 | Lens 4 | QT1 | −3.759 | 0.491 | 2.544 | Plastic | 1.67 | 19.2 | 3375.476 |
| 9 | | | −3.951 | 2.902 | 2.532 | | | | |
| 10 | Mirror | Plano | Infinity | 10.726 | 3.561 | | | | |

TABLE 10-continued

Embodiment 350
EFL = 18.00 mm, F number = 3.1, HFOV = 14.2 deg.

| Surface # | Comment | Type | Curvature Radius | Thickness | Aperture Radius (D/2) | Material | Index | Abbe # | Focal Length |
|---|---|---|---|---|---|---|---|---|---|
| 11 | Filter | Plano | Infinity | 0.210 | — | Glass | 1.52 | 64.2 | |
| 12 | | | Infinity | 0.350 | — | | | | |
| 13 | Image | Plano | Infinity | — | — | | | | |

TABLE 11

| | | Aspheric Coefficients | | | | | | | |
|---|---|---|---|---|---|---|---|---|---|
| Surface # | Norm Radius | A0 | A1 | A2 | A3 | A4 | A5 | A6 | A7 |
| 2 | 3.023 | −1.75E−01 | 1.60E−03 | −3.30E−03 | −1.42E−03 | −7.48E−04 | −1.68E−04 | −4.26E−05 | −3.64E−05 |
| 3 | 2.956 | 2.61E−01 | −4.54E−02 | −6.55E−03 | −2.54E−04 | −9.33E−04 | −4.97E−04 | −2.64E−05 | −2.54E−05 |
| 4 | 2.860 | −2.00E−01 | −3.11E−02 | −1.01E−02 | −3.86E−03 | −6.51E−04 | −3.66E−04 | −2.41E−04 | −1.85E−04 |
| 5 | 2.803 | −7.32E−01 | −1.81E−01 | −6.31E−02 | −3.28E−02 | −1.10E−04 | −1.34E−03 | −7.55E−04 | −6.47E−04 |
| 6 | 2.910 | 1.88E+00 | −1.28E−01 | −1.51E−02 | −3.73E−02 | −1.16E−02 | −1.61E−02 | −5.93E−03 | −1.22E−03 |
| 7 | 2.779 | 1.29E+00 | −4.92E−02 | −1.64E−02 | −2.79E−02 | −2.02E−02 | −1.89E−02 | −7.11E−03 | −1.17E−03 |
| 8 | 2.811 | 1.17E+00 | 8.03E−03 | −2.09E−02 | −1.38E−02 | −9.40E−04 | −1.80E−03 | −3.20E−04 | −2.19E−05 |
| 9 | 2.820 | 8.39E−01 | 5.59E−02 | −3.25E−03 | −7.79E−03 | −7.62E−04 | −3.16E−04 | −1.17E−04 | −1.12E−04 |

Values and ratios included in lens systems 340 and 350 are given in Table 12. In Table 12, same definitions and units are used as in Table 1.

TABLE 12

| | 340 | 350 |
|---|---|---|
| $WL_M$ | 6.10 | 5.90 |
| $WL_O$ | 6.00 | 5.80 |
| LT | 4.00 | 4.40 |
| $H_{OPFE-ON}$ | 3.69 | 3.46 |
| HS | 5.76 | 5.54 |
| SD | 9.60 | 9.23 |
| ΔL-O | 1.364 | 0.72 |
| $TTL_1$ | 6.70 | 7.10 |
| $BFL_1$ | 2.69 | 2.90 |
| $TTL_2$ | 9.26 | 11.35 |
| TTL | 15.96 | 18.45 |
| BFL | 11.96 | 14.25 |
| EFL | 16.69 | 18.00 |
| DA | 6.00 | 5.80 |
| $d_{34}$ | 0.04 | |
| $d_{12}$ | | 0.04 |
| $f_1$ | 6.47 | 5.94 |
| $f_2$ | −2.52 | −7.57 |
| $f_3$ | 3.92 | 5596.38 |
| $T_1$ | 1.85 | 1.05 |
| f number | 2.78 | 3.10 |
| HFOV | 15.77 | 14.20 |
| MML | 13.28 | 14.52 |
| ML | 16.78 | 18.02 |
| $MMH_{ON}$ | 8.80 | 8.62 |
| $MH_{ON}$ | 10.30 | 10.12 |
| $B_{min-ON}$ | 1.80 | 1.62 |
| $T_1/LT$ | 0.46 | 0.24 |
| ΔL-O/TTL | 0.08546 | 0.03886 |
| $f_1$/EFL | 0.388 | 0.330 |
| $f_2$/EFL | −0.151 | −0.421 |
| $f_3$/EFL | 0.235 | 310.910 |
| $d_{34}$/LT (%) | 0.875 | |
| $d_{23}$/LT (%) | | 0.818 |
| TTL/EFL | 0.96 | 1.03 |
| SD/EFL | 0.58 | 0.51 |
| SD/$MH_{ON}$ | 0.93 | 0.91 |
| BFL/EFL | 0.72 | 0.79 |
| BFL/TTL | 0.75 | 0.77 |

It is noted that in the following, it is referred to a "height" of a lens element (e.g. clear height, mechanical height etc.). In the optical lens system disclosed herein, as well as in Table 1 and Table 12, to this height is referred as "width" of a lens or lens element (e.g. $WL_M$, $WL_O$ etc.). This is because in the optical lens system disclosed herein, a lens optical axis is perpendicular to a normal on an image sensor, in contrast to exemplary optical lens systems as see below, where a lens optical axis is parallel to a normal on an image sensor.

As explained below, a clear height value $CH(S_k)$ can be defined for each surface $S_k$ for 1≤k≤2N), and a clear aperture value $CA(S_k)$ can be defined for each surface $S_k$ for 1≤k≤2N). $CA(S_k)$ and $CH(S_k)$ define optical properties of each surface $S_k$ of each lens element. The CH term is defined with reference to FIG. 5A and the CA term is defined with reference to FIG. 5B, below. In addition, a height ("$H_{Li}$", for 1≤i≤N) is defined for each lens element $L_i$. $H_{Li}$ corresponds, for each lens element $L_i$, to the maximal height of lens element $L_i$ measured along an axis perpendicular to the optical axis of the lens elements. For a given lens element, the height is greater than, or equal to the clear height value CH and the clear aperture value CA of the front and rear surfaces of this given lens element. Typically, for an axial symmetric lens element, $H_{Li}$ is the diameter of lens element $L_i$ as seen in FIG. 6. Typically, for an axial symmetric lens element, $H_{Li}$=max{$CA(S_{2i-1})$, $CA(S_{2i})$}+a mechanical part size. In general, in lens design the mechanical part size is defined as not contributing to the optical properties of the lens. Because of this, one defines (FIG. 6) two heights of a lens: an optical height $H_{opt}$ (corresponding to the CA value) of an optically active area 602 and a geometrical (or mechanical) height of the lens $H_L$ of an entire lens area 604 that covers an optically active and an optically inactive area. The mechanical part and its properties are defined below. The mechanical part size contribution to $H_{Li}$ is typically 200-1000 μm.

As shown in FIGS. 4A, 4B and 5A, 5B, each optical ray that passes through a surface $S_k$ (for 1≤k≤2N) impinges this surface on an impact point IP. Optical rays enter camera 200 or 220 from surface $S_1$ and pass through surfaces $S_2$ to $S_{2N}$.

Figure 4A:
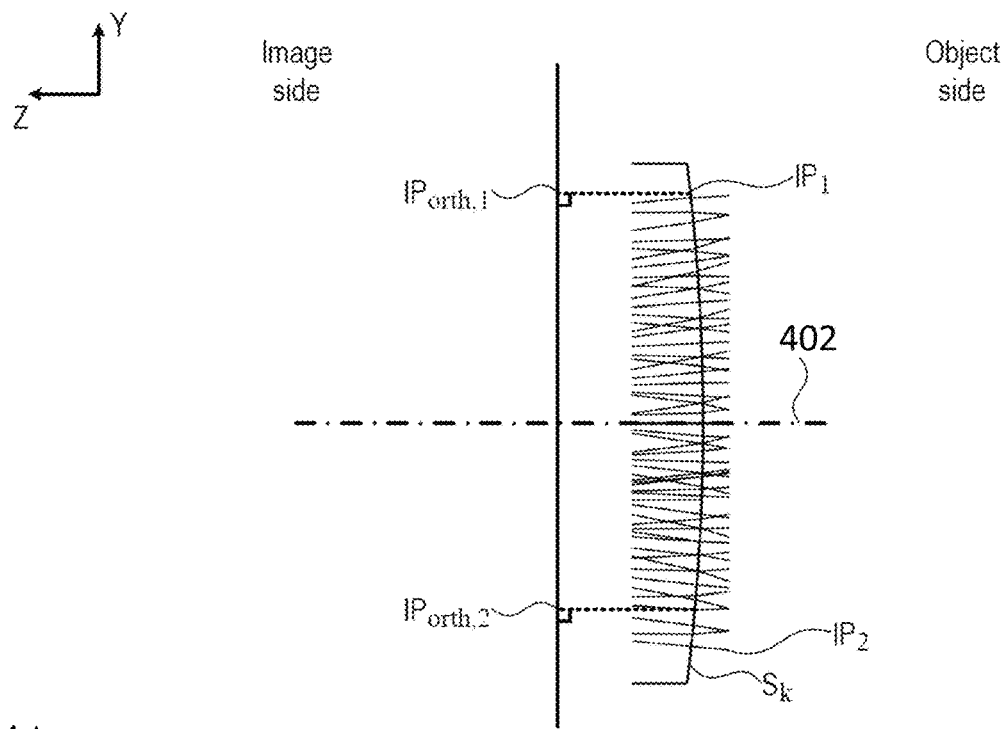
FIG. 4A illustrates orthogonal projections $IP_{orth,1}$, $IP_{orth,2}$ of two impact points $IP_1$ and $IP_2$ on a plane P.
Figure 4B:
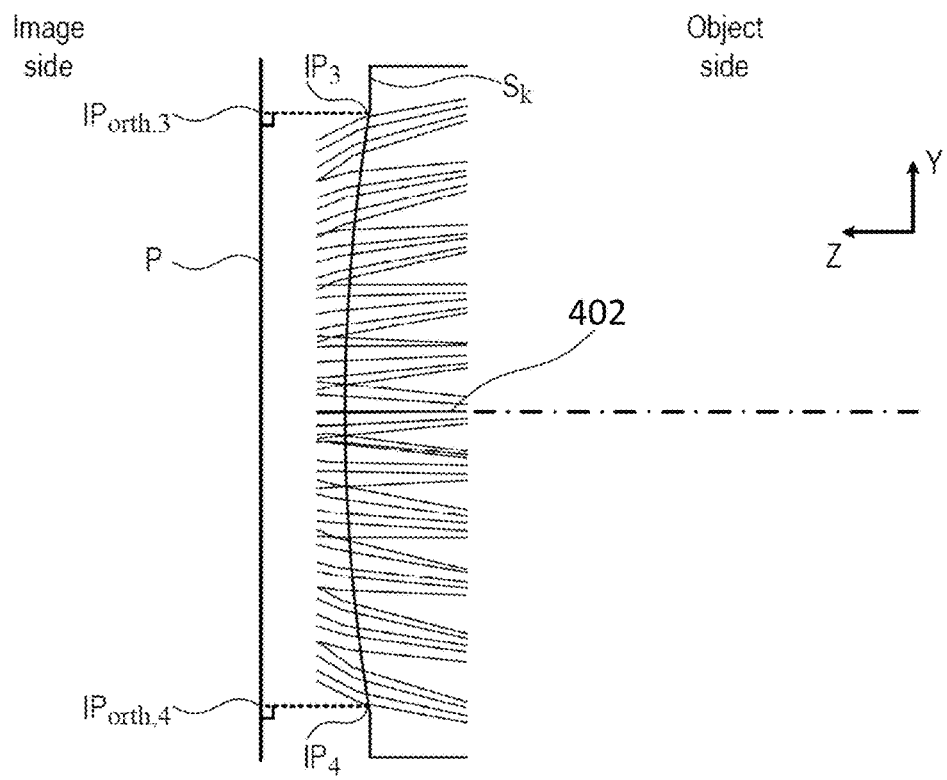
FIG. 4B illustrates orthogonal projections $IP_{orth,3}$, $IP_{orth,4}$ of two impact points $IP_3$ and $IP_4$ on plane P.

Some optical rays can impinge on any surface $S_k$ but cannot/will not reach image sensor 206. For a given surface $S_k$, only optical rays that can form an image on image sensor 206 are considered. $CH(S_k)$ is defined as the distance between two closest possible parallel lines (see lines 500 and 502 in FIG. 5A located on a plane P orthogonal to the optical axis of the lens elements. In the representation of FIGS. 4A and 4B, plane P is parallel to plane X-Y and is orthogonal to optical axis 402 such that the orthogonal projection $IP_{orth}$ of all impact points IP on plane P is located between the two parallel lines. $CH(S_k)$ can be defined for each surface $S_k$ (front and rear surfaces, with $1 \le k \le 2N$).

The definition of $CH(S_k)$ does not depend on the object currently imaged, since it refers to the optical rays that "can" form an image on the image sensor. Thus, even if the currently imaged object is located in a black background that does not produce light, the definition does not refer to this black background since it refers to any optical rays that "can" reach the image sensor to form an image (for example optical rays emitted by a background that would emit light, contrary to a black background).

For example, FIG. 4A illustrates the orthogonal projections $IP_{orth,1}$, $IP_{orth,2}$ of two impact points $IP_1$ and $IP_2$ on plane P that is orthogonal to optical axis 402. By way of example, in the representation of FIG. 4A, surface $S_k$ is convex.

FIG. 4B illustrates the orthogonal projections $IP_{orth,3}$, $IP_{orth,4}$ of two impact points $IP_3$ and $IP_4$ on plane P. By way of example, in the representation of FIG. 4B, surface $S_k$ is concave.

Figure 5A:
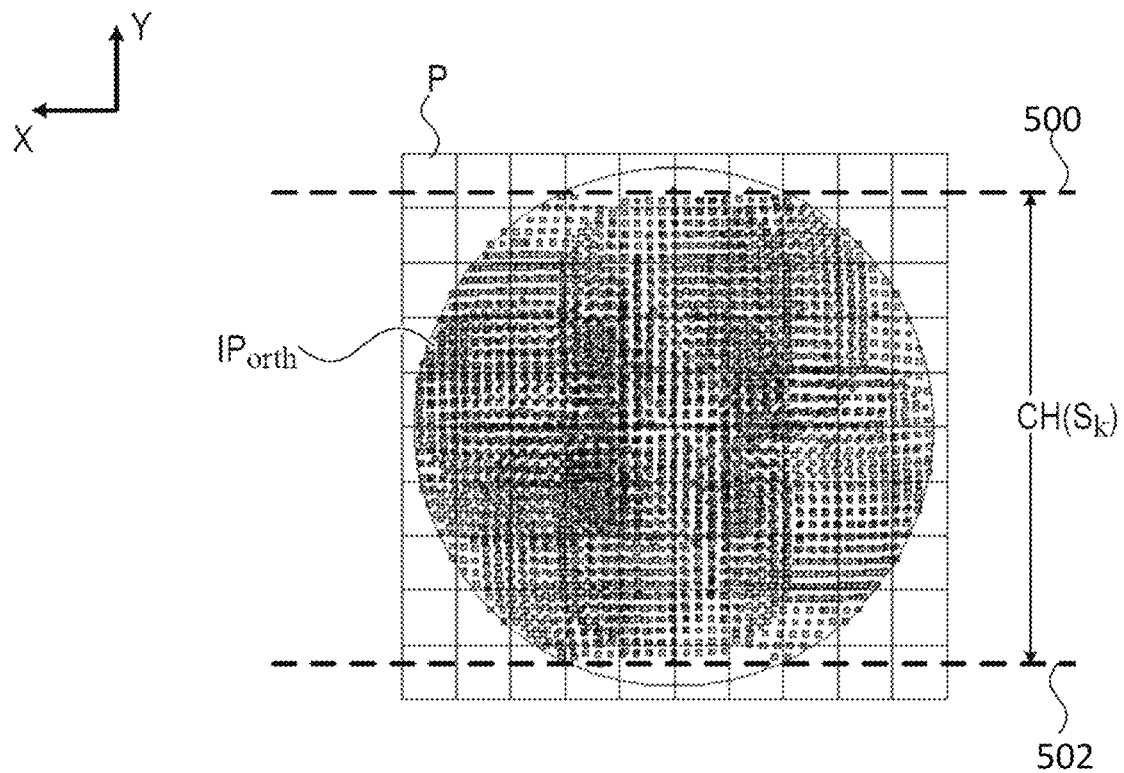
FIG. 5A provides a definition of clear height (CH)
Figure 6:
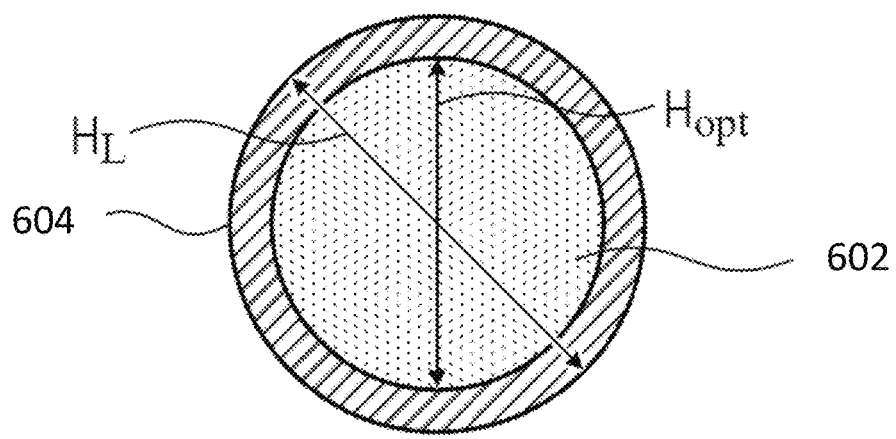
FIG. 6 provides definitions of $H_L$ and $H_{opt}$.

In FIG. 5A, the orthogonal projection $IP_{orth}$ of all impact points IP of a surface $S_k$ on plane P is located between parallel lines 500 and 502. $CH(S_k)$ is thus the distance between lines 500 and 502.

Figure 5B:
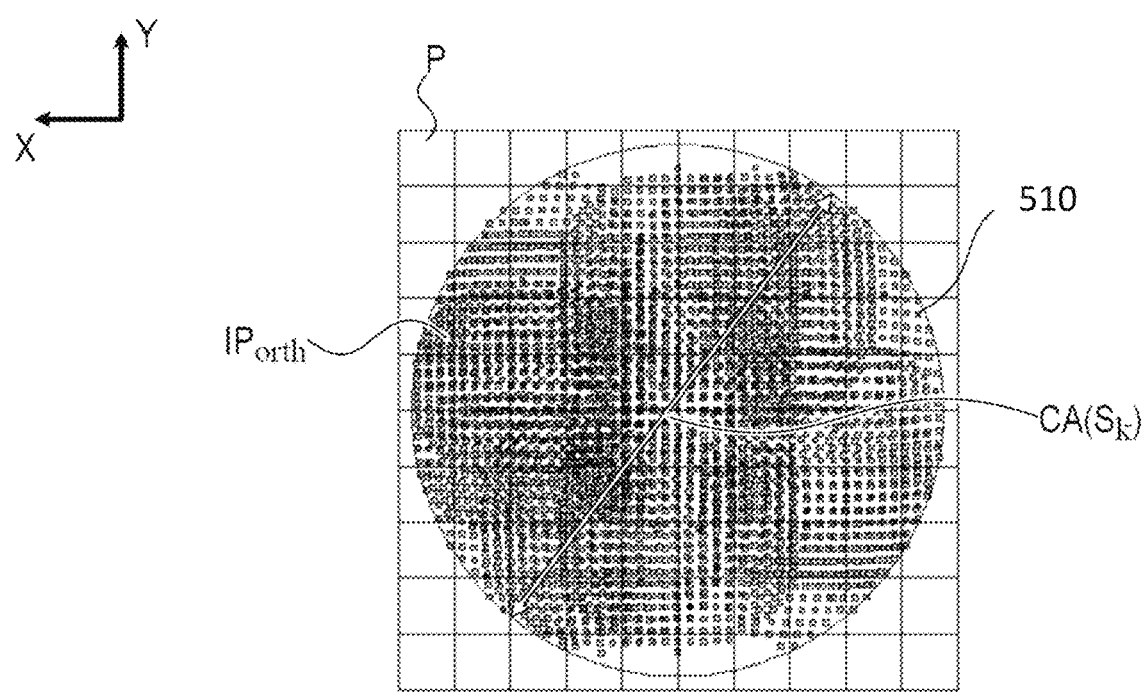
FIG. 5B provides a definition of clear aperture (CA)

Attention is drawn to FIG. 5B. According to the presently disclosed subject matter, a clear aperture $CA(S_k)$ is defined for each given surface $S_k$ (for $1 \le k \le 2N$), as the diameter of a circle, wherein the circle is the smallest possible circle located in a plane P orthogonal to the optical axis 402 and encircling all orthogonal projections $IP_{orth}$ of all impact points on plane P. As mentioned above with respect to $CH(S_k)$, the definition of $CA(S_k)$ also does not depend on the object that is currently imaged.

As shown in FIG. 5B, the circumscribed orthogonal projection $IP_{orth}$ of all impact points IP on plane P is a circle 510. The diameter of circle 510 defines $CA(S_k)$.

Figure 7:
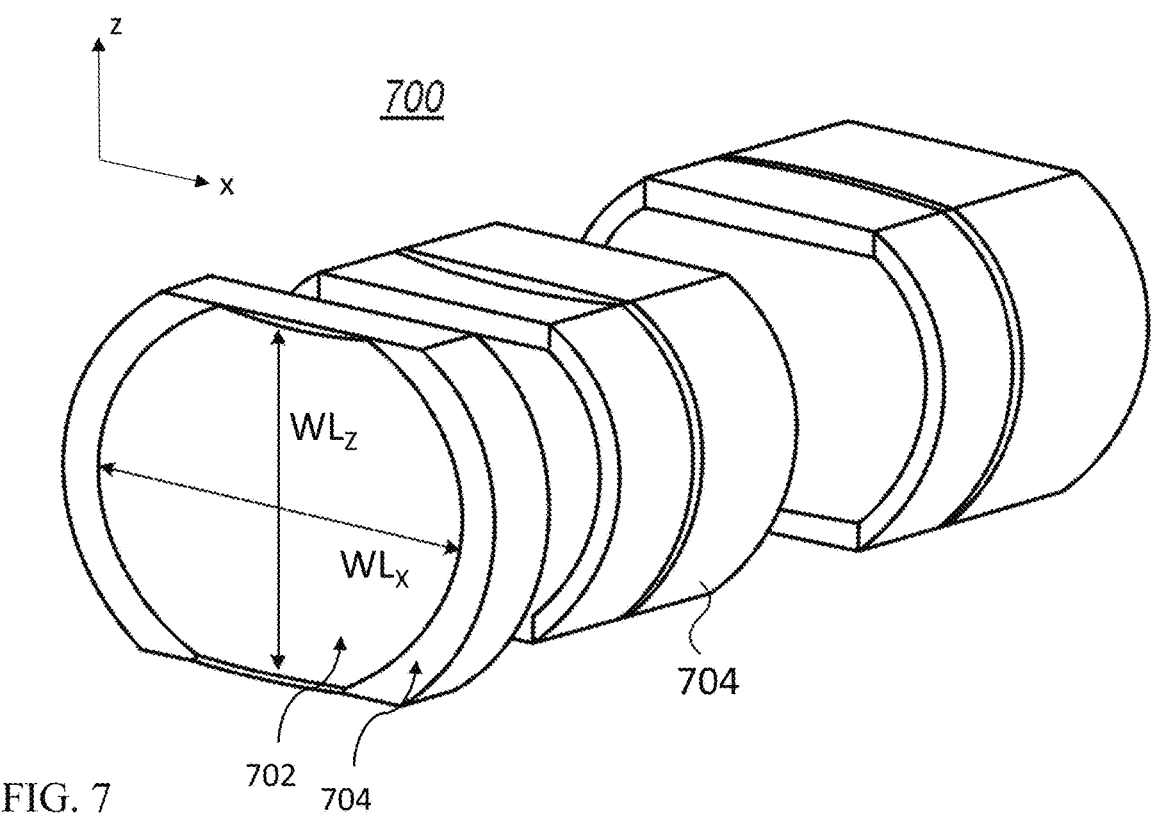
FIG. 7 shows a lens barrel that includes a plurality of cut lens elements and a lens housing.

FIG. 7 shows a lens barrel 700 that includes a plurality of cut lens elements and a lens housing 704. A first cut lens element $L_1$ 702 is visible. $L_1$ has a width along the x-axis ("$WL_X$") that is larger than the width along the z-axis ("$WL_Z$"), i.e. $WL_X > WL_Z$. The x-axis and the z-axis are oriented identical as in FIG. 2A and FIG. 2B.

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable subcombination.

Unless otherwise stated, the use of the expression "and/or" between the last two members of a list of options for selection indicates that a selection of one or more of the listed options is appropriate and may be made.

It should be understood that where the claims or specification refer to "a" or "an" element, such reference is not to be construed as there being only one of that element.

All patents and patent applications mentioned in this specification are herein incorporated in their entirety by reference into the specification, to the same extent as if each individual patent or patent application was specifically and individually indicated to be incorporated herein by reference. In addition, citation or identification of any reference in this application shall not be construed as an admission that such reference is available as prior art to the present disclosure.

What is claimed is:

1. A camera, comprising:
   a lens having an optical axis (OA), $N \ge 4$ lens elements $L_i$ wherein $1 \le i \le N$ and an effective focal length EFL, wherein a first lens element $L_1$ faces an object side and a last lens element $L_N$ faces an image side;
   an image sensor; and
   an optical path folding element (OPFE) for providing a folded optical path between an object and the image sensor, by folding light from a first optical path (OP1) that is parallel to the OA to a second optical path (OP2) that is perpendicular to the image sensor,
   wherein the lens is located at an object side of the OPFE, wherein the EFL is in the range of 8 mm<EFL<50 mm, and wherein the OPFE is oriented at an angle β in the range of $45 < \beta \le 60$ degrees with respect to the lens OA such that OP1 and OP2 form an angle of less than 90 degrees.

2. The camera of claim 1, wherein $47 < \beta \le 55$ degrees.

3. The camera of claim 1, wherein $48 < \beta < 52.5$ degrees.

4. The camera of claim 1, the image sensor having a sensor diagonal SD, and wherein 0.45<SD/EFL<0.7.

5. The camera of claim 1, wherein $L_1$ is made of glass.

6. The camera of claim 1, wherein all the lens elements are made of plastic.

7. The camera of claim 1, included in a camera module having a module height (MH) measured along OP1, wherein SD/MH>0.9.

8. The camera of claim 1, included in a camera module having a module length (ML) measured along an axis perpendicular to OP1, wherein EFL/ML>0.9.

9. The camera of claim 1, wherein the lens has a total track length (TTL) and a back focal length (BFL), and wherein BFL/TTL>0.7.

10. The camera of claim 1, wherein 12 mm<EFL<20 mm.

11. The camera of claim 1, wherein the image sensor has a sensor diagonal (SD), and wherein 7 mm<SD<10 mm.

12. The camera of claim 1, wherein the lens has a f number (f/ #), and wherein the f/ # is in the range 2.0<f/#<3.5.

13. The camera of claim 12, wherein f/ #<2.9.

14. The camera of claim 1, wherein N=4 and wherein a power sequence of lens elements $L_1$, $L_2$, $L_3$, and $L_4$ is positive, negative, positive and negative.

15. The camera of claim 1, wherein N=4 and wherein a power sequence of lens elements $L_1$, $L_2$, $L_3$, and $L_4$ is positive, negative, positive and positive.

16. The camera of claim 1, wherein the camera is included in a camera module, wherein the camera module has a first module region with a module region height (MH) measured along OP1 and a second shoulder region with a shoulder region height (SH) measured along OP1, and wherein MH>SH.

17. The camera of claim 16, included in a camera module having a module height (MH) measured along OP1, wherein 6 mm<MH<13 mm.

18. The camera of claim 16, wherein the camera has an aperture diameter (DA), and wherein DA>SH-3 mm.

19. The camera of claim 1, wherein the camera is included in a mobile device.

20. The camera of claim 19, wherein the mobile device is a smartphone.

* * * * *